United States Patent
Asakawa et al.

[11] Patent Number: 6,072,458
[45] Date of Patent: *Jun. 6, 2000

[54] PROJECTION-TYPE LIQUID CRYSTAL DISPLAY DEVICE

[75] Inventors: Katsumi Asakawa; Hiroaki Ishitani; Kozo Ishida; Kouhei Tamano; Shigeharu Yoshikawa; Hiroaki Sugiura, all of Tokyo, Japan

[73] Assignee: Mitsubishi Denki Kabushiki Kaisha, Tokyo, Japan

[*] Notice: This patent is subject to a terminal disclaimer.

[21] Appl. No.: 08/842,400

[22] Filed: Apr. 24, 1997

[30] Foreign Application Priority Data

Jul. 29, 1996 [JP] Japan ..................... 8-198690

[51] Int. Cl.[7] ............... G09G 3/36; G09G 5/00
[52] U.S. Cl. ............... 345/101; 345/1; 345/2; 345/3; 345/102
[58] Field of Search .................. 345/101, 102, 345/1–3

[56] References Cited

U.S. PATENT DOCUMENTS

| | | | |
|---|---|---|---|
| 4,745,403 | 5/1988 | Tamura | 340/713 |
| 4,763,922 | 8/1988 | Takeda et al. | 349/72 |
| 4,923,285 | 5/1990 | Ogino et al. | 350/350 |
| 5,033,822 | 7/1991 | Ooki et al. | 350/332 |
| 5,041,821 | 8/1991 | Onitsuka et al. | 345/94 |
| 5,253,074 | 10/1993 | Wortel et al. | . |
| 5,300,942 | 4/1994 | Dolgoff | 345/32 |
| 5,317,332 | 5/1994 | Kanno et al. | 345/101 |
| 5,748,171 | 5/1998 | Ishizaki et al. | 345/101 |

FOREIGN PATENT DOCUMENTS

| | | |
|---|---|---|
| 0425989 | 5/1991 | European Pat. Off. . |
| 0491429 | 6/1992 | European Pat. Off. . |
| 0509630 | 10/1992 | European Pat. Off. . |
| 7-9136 | 3/1995 | Japan . |
| 7230069 | 8/1995 | Japan . |
| 8149494 | 6/1996 | Japan . |
| 2207272 | 1/1989 | United Kingdom . |
| 2254709 | 10/1992 | United Kingdom . |
| 2301450 | 12/1996 | United Kingdom . |
| WO8906417 | 7/1989 | WIPO . |

*Primary Examiner*—Richard A. Hjerpe
*Assistant Examiner*—Duc Q. Dinh

[57] ABSTRACT

A projection-type liquid crystal display device having a light source for emitting a luminous flux; a liquid crystal light valve for modulating the luminous flux emitted by the light source means; a liquid crystal drive circuit for applying the common voltage to the common electrode and the video signal to the source electrode; a projection lens for projecting the luminous flux modulated by the liquid crystal light valve onto a screen; a liquid crystal temperature detector for detecting temperature in the vicinity of the liquid crystal light valve; and a controller. The controller controls the common voltage and/or the source voltage on the basis of values detected by the liquid crystal temperature detector in such a way that fluctuation in the light transmittance of the liquid crystal light valve means is reduced.

4 Claims, 24 Drawing Sheets

PROJECTION-TYPE LIQUID CRYSTAL DISPLAY DEVICE

BACKGROUND OF THE INVENTION

The present invention relates to a projection-type liquid crystal display device wherein control of voltage applied to a liquid crystal panel, the operating capacity of cooling fans or the like is carried out on the basis of values detected by a temperature detector.

FIG. 25 is a structural diagram schematically showing a projection-type liquid crystal display device according to prior art, as disclosed in Japanese Utility Model Kokoku Publication No. H7-9136 (i.e., No. 9136/1995), wherein a luminous flux (shown by arrows on dot-dash lines) emitted from a light source 43 within a case 42 passes through condenser lens 44, impinges on a liquid crystal panel 45 and is modulated, after which it is enlarged and projected onto a screen 51 by a projection lens 46. The case 42 is further provided with cooling fans 47 and 48, which cause air to flow in a direction W (shown by arrows on solid lines), thereby cooling the interior of the case 42. Reference numerals 49 and 50 represent temperature detectors such as thermistors.

When, however, the projection-type liquid crystal display device according to the above-described prior art is used in a low-temperature environment, the liquid crystal panel 45 does not reach the optimum operating temperature, thereby raising problems, which include slower rate of response, lower moving picture resolution, and, when changing to another image, superimposition of a residual image.

To overcome these problems, it may be considered possible to make use of a liquid crystal panel made of liquid crystal polymer composite (LCPC) material, but it has been found that, depending on liquid crystal panel temperature, it is not possible adequately to overcome the problem of hysteresis in which a residual image is superimposed when changing from one still picture to another.

The projection-type liquid crystal display device according to the above-described prior art had the further problem that, due to changes in the liquid crystal panel temperature, the characteristic curve of the applied voltage vs. light transmittance of the liquid crystal panel would shift and the slope of the characteristic curve is changed, resulting in degradation of the brightness and contrast of the projected image.

Further, in a projection-type liquid crystal display device in which red, green and blue luminous fluxes are modulated, respectively, by three liquid crystal panels and these luminous fluxes are then synthesized to project a color image, a problem arose with respect to the tint of the color image due to difference in the temperatures and color characteristics of the various liquid crystal panels.

FIG. 26 through FIG. 28 are graphs showing the results of measurements of the input signal vs. chroma saturation characteristics for red luminous flux (R), green luminous flux (G) and blue luminous flux (B) in a prototype projection-type liquid crystal display device. From FIG. 26 through FIG. 28, it may be seen that the red and blue luminous fluxes are more abrupt (that is to say, the slope of the characteristic curves is steeper) than in the case of the green luminous flux. The chroma saturation is obtained by the following method. The common voltage amplitude applied to the liquid crystal panel was fixed in an environment of a certain temperature, measurements were made of the illuminance, x and y chromaticity coordinates and tristimulus values Y, and these were converted to the values in the 1976 L*a*b* uniform sensible color space of the CIE (Commission Internationale de l'Eclairage), which is the uniform color space perceived by the human eye.

$$C = (a^{*^2} + b^{*^2})^{(1/2)} \qquad (1)$$

In Equation (1), ^ indicates an exponent, and the common voltage amplitude indicates the difference between the upper and lower common voltage peak values when the device is driven by an alternating voltage which causes polarity to be reversed field by field or frame by frame.

SUMMARY OF THE INVENTION

It is an object of the present invention to provide a projection-type liquid crystal display device that can minimize unnecessary fluctuation in the brightness, contrast and tint of the projected image that are due to fluctuation in the temperature of the liquid crystal panel, thereby projecting in a stable manner a good-quality image.

According to one aspect of the present invention, a projection-type liquid crystal display device has: a light source for emitting a luminous flux; a liquid crystal light valve, which has a common electrode to which a common voltage is applied and a source electrode to which a video signal is applied, for modulating the luminous flux emitted by the light source; a liquid crystal drive circuit for applying the common voltage to the common electrode and the video signal to the source electrode; a projection lens for projecting the luminous flux modulated by the liquid crystal light valve onto a screen; a liquid crystal temperature detector for detecting temperature in the vicinity of the liquid crystal light valve; and a controller for controlling the common voltage on the basis of values detected by the liquid crystal temperature detector in such a way that fluctuation in a light transmittance of the liquid crystal light valve is reduced.

According to another aspect of the present invention, a projection-type liquid crystal display device comprising: a light source for emitting a luminous flux; a liquid crystal light valve, which has a common electrode to which a common voltage is applied and a source electrode to which a video signal is applied, for modulating the luminous flux emitted by the light source; a liquid crystal drive circuit for applying the common voltage to the common electrode and the video signal to the source electrode; a projection lens for projecting the luminous flux modulated by the liquid crystal light valve onto a screen; a liquid crystal temperature detector for detecting temperature in the vicinity of the liquid crystal light valve; and a controller for controlling voltage of the video signal on the basis of values detected by the liquid crystal temperature detector in such a way that fluctuation in a light transmittance of the liquid crystal light valve is reduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 18A, 18B and 18C relate to the video signal applied to the source electrode of a projection-type liquid crystal display device according to the twelfth embodiment, wherein FIG. 18A shows a normal waveform, FIG. 18B shows a waveform with brightness increased, and FIG. 18C shows a waveform with contrast increased;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and information will become apparent to those skilled in the art from the detailed description.

First Embodiment

Figure 1:
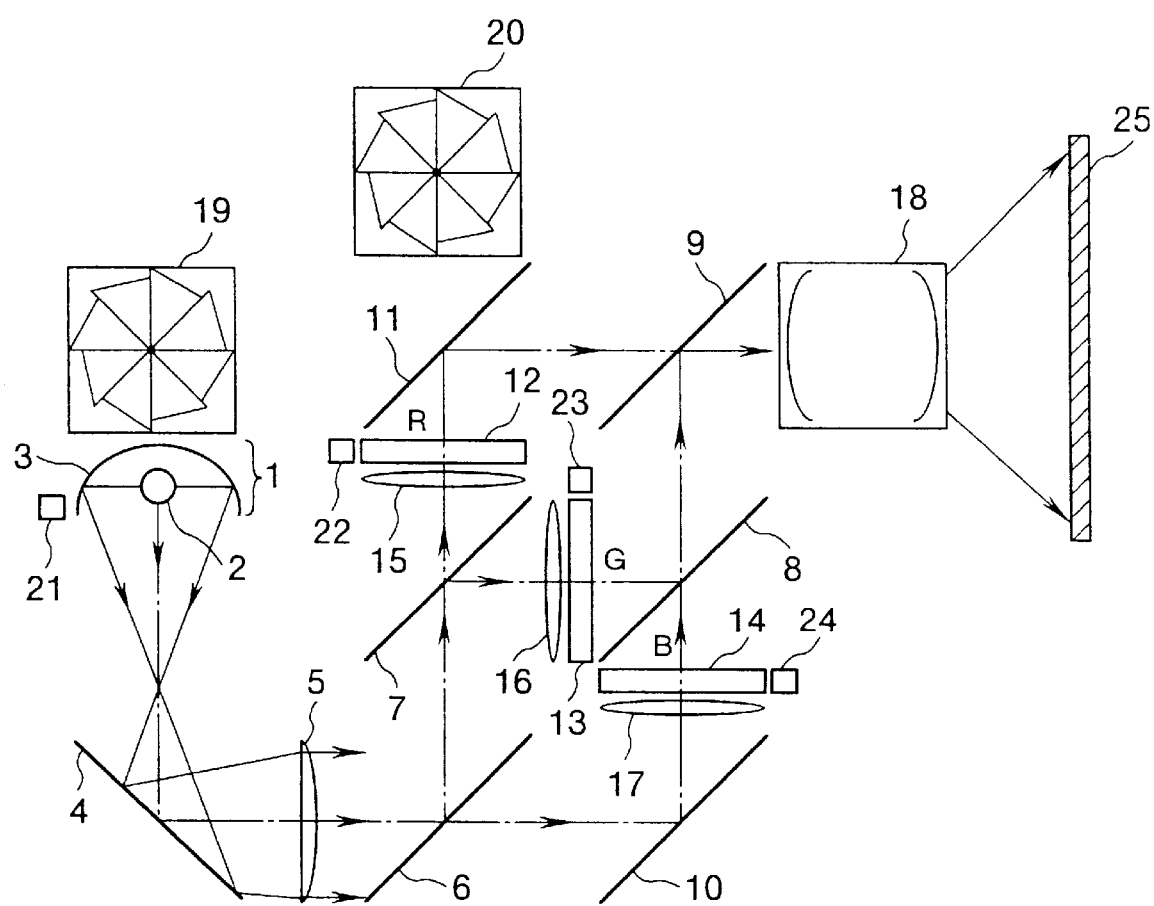
FIG. 1 is a structural diagram schematically showing the optical system and the cooling system of a liquid crystal display device according to a first embodiment of the present invention.

FIG. 1 is a structural diagram schematically showing an optical system and a cooling system of a projection-type liquid crystal display device according to a first embodiment of the present invention. As shown in FIG. 1, the projection-type liquid crystal display device of the first embodiment has a light source 1 including a white lamp 2, which may be a metal halide lamp, xenon lamp, halogen lamp or the like, and an elliptical mirror 3; a mirror 4, which reflects the luminous flux emitted by the light source 1; and a collimator lens 5, which renders the luminous flux reflected by the mirror 4 into a parallel luminous flux.

Further, the projection-type liquid crystal display device of the first embodiment also has, as its color-separating optical system, a dichroic mirror 6, which passes the blue component (B) of the light and reflects the other components of the light; and a dichroic mirror 7, which passes the red component (R) of the light and reflects the other components of the light. Furthermore, the projection-type liquid crystal display device of the first embodiment also has a dichroic mirror 8, which passes the blue component of the light and reflects the other components of the light, and a dichroic mirror 9, which passes the red component of the light and reflects the other components of the light.

Further, the projection-type liquid crystal display device of the first embodiment also has a mirror 10, which reflects the blue luminous flux passed by the dichroic mirror 6; a mirror 11, which reflects the red component of the luminous flux; a field lens 15 for red light (R); a field lens 16 for green light (G); a field lens 17 for blue light (B); a liquid crystal light valve (hereinafter referred to as "liquid crystal panel") 12 for red light; a liquid crystal panel 13 for green light; a liquid crystal panel 14 for blue light; and a projection lens 18, which enlarges and projects an image onto a screen 25. The liquid crystals constituting the liquid crystal panels 12, 13 and 14 are made of LCPC material.

The projection-type liquid crystal display device of the first embodiment further has a light source cooling fan 19 mounted in the vicinity of the light source 1; a liquid crystal panel cooling fan 20 mounted in the vicinity of the liquid crystal panels 12, 13 and 14; a temperature detector 21 such as a thermistor to detect the temperature in the vicinity of the light source 1; and temperature detectors 22, 23 and 24 such as thermistors to detect the temperature in the vicinity of the liquid crystal panels 12, 13 and 14.

In the projection-type liquid crystal display device of the first embodiment having the above-described structure, the luminous flux emitted from the white lamp 2 is reflected from the elliptical mirror 3 and converged, and is then reflected from the mirror 4 to impinge on the collimator lens 5 and be converted into a parallel luminous flux. The parallel luminous flux is then separated by the dichroic mirrors 6 and 7 into the three primary colors red, green and blue, and the luminous fluxes of each color pass through the field lenses 15, 16 and 17 respectively to impinge upon the liquid crystal panels 12, 13 and 14. The liquid crystal panels 12, 13 and 14 are driven by the drive circuit (not shown in FIG. 1) and form monochrome images corresponding, respectively, to the red, green and blue video signals.

The red, green and blue transmitted luminous fluxes that have been modulated by the images formed on the liquid crystal panels 12, 13 and 14 respectively are synthesized into a single luminous flux by the dichroic mirrors 8 and 9. The synthesized luminous flux passes through the projection lens 18, and is converted into a projection beam, and enlarged and projected onto the screen 25 to display a color image. The field lenses 15, 16 and 17 convert the parallel luminous fluxes into a focused beam, and cause it to impinge efficiently on the projection lens 18.

Figure 2:
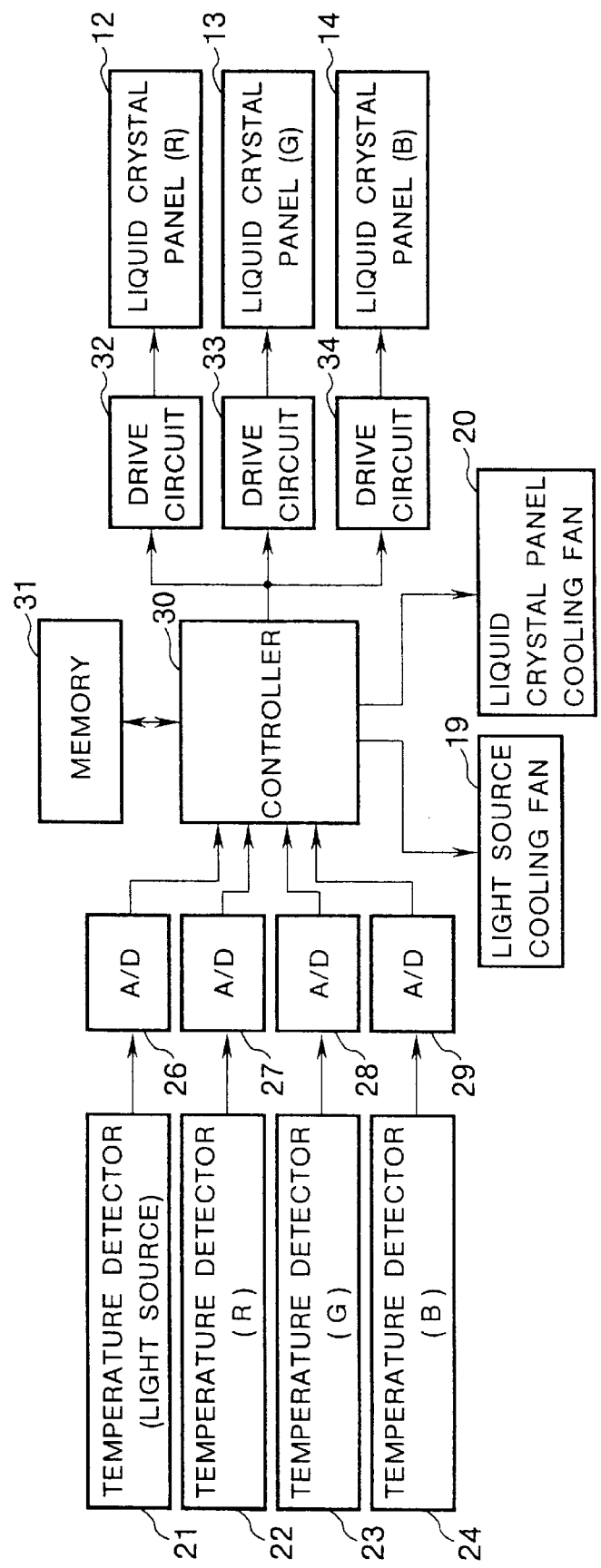
FIG. 2 is a block diagram showing the structure of the control system of a liquid crystal display device according to first, second, fifth through eighth, thirteenth, fourteenth, and sixteenth through eighteenth embodiments of the present invention.

FIG. 2 is a block diagram showing the structure of the control system of the projection-type liquid crystal display device of the first embodiment. Those structures in FIG. 2 that are identical to the structures in FIG. 1 are assigned to the identical symbols. In FIG. 2, reference numerals 26, 27, 28 and 29 indicate A-D converters that convert into digital signals the analog signals that are output by the temperature detectors 21, 22, 23 and 24 respectively. Further, reference numerals 32, 33 and 34 indicate drive circuits that apply a common voltage to the common electrodes and video signals (source voltage) to the source electrodes of the liquid crystal panels 12, 13 and 14 respectively. Furthermore, reference numeral 31 indicates a memory, which stores control values for the driving voltage of the temperature-dependent liquid crystal panels 12, 13 and 14 for each color, and 30 indicates a controller that controls operation of the device as a whole.

Figure 18A:
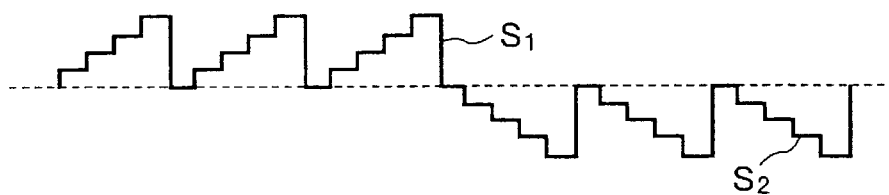
Figure 20:
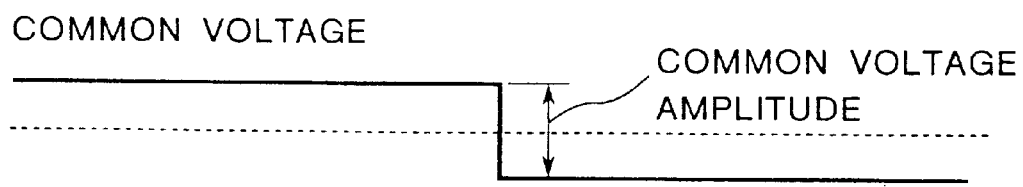
FIG. 20 is a waveform diagram showing the AC drive of the common voltage applied to the common electrode of a projection-type liquid crystal display device according to the twelfth embodiment.
Figure 21A:
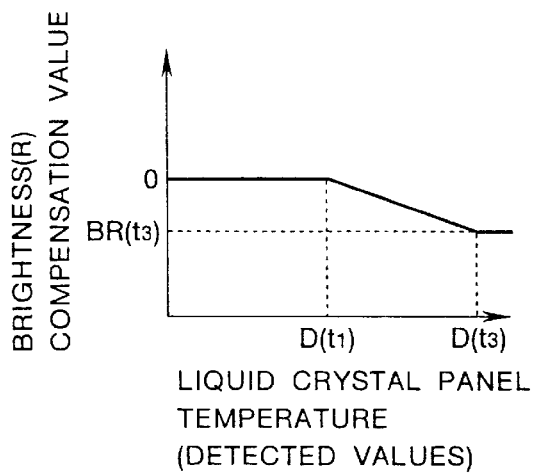
FIGS. 21A, 21B, 21C and 21D are a series of graphs showing the control values additionally stored in the memory 31 of the projection-type liquid crystal display device according to the twelfth embodiment.
Figure 21B:
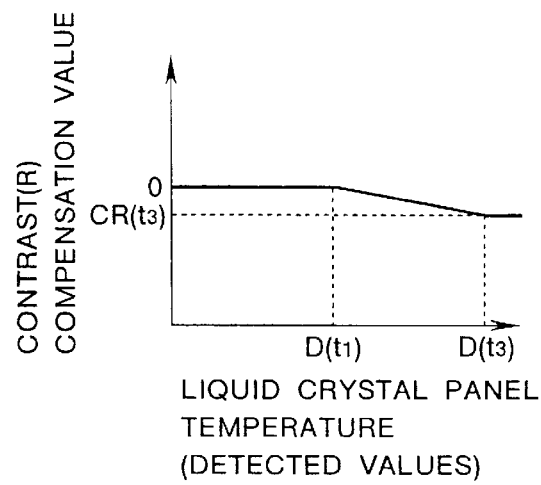
Figure 21C:
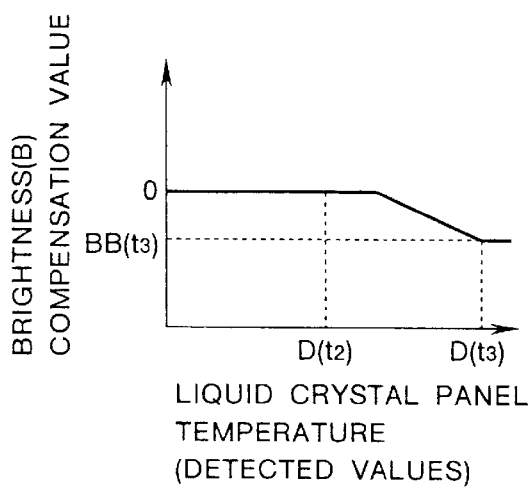
Figure 21D:
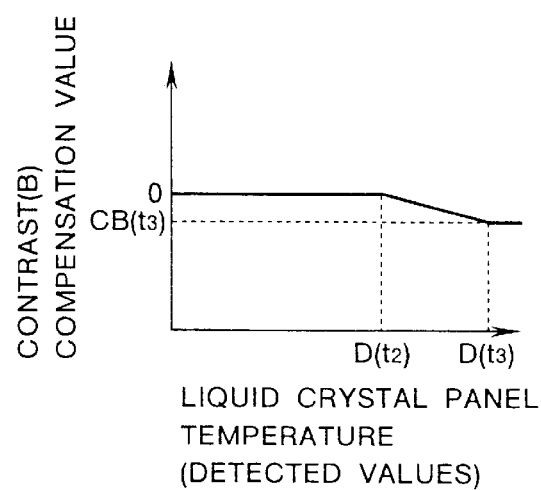
Figure 22A:
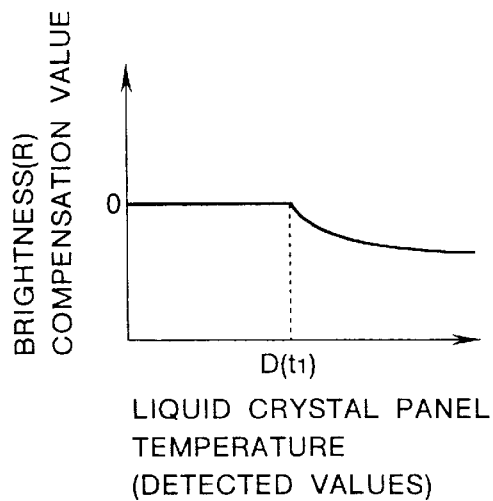
FIGS. 22A, 22B, 22C and 22D are a series of graphs showing the control values additionally stored in the memory 31 of the projection-type liquid crystal display device according to a thirteenth embodiment.
Figure 22B:
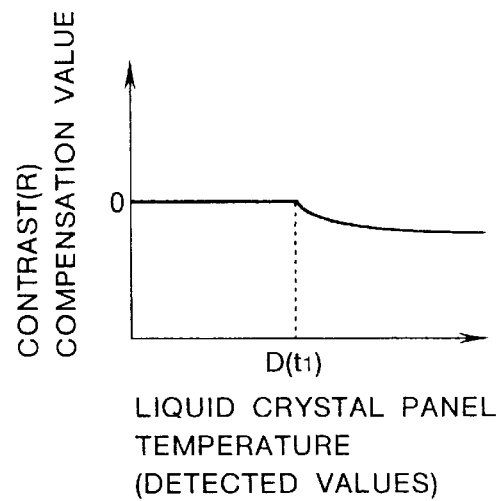
Figure 22C:
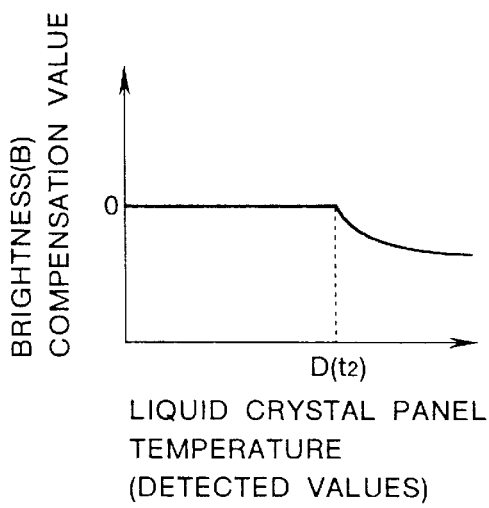
Figure 22D:
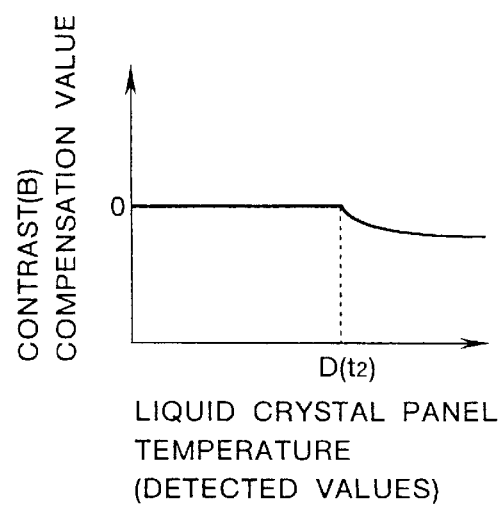

The liquid crystal panels 12, 13 and 14 are constructed so as to be driven by alternating current, and the drive circuits 32, 33 and 34 reverse, field by field or frame by frame, the polarity of the common voltages applied to the common electrodes and the video signals applied to the source electrodes of the liquid crystal panels 12, 13 and 14 respectively, as shown in FIG. 20 and FIG. 18A described below. The reason for applying alternating current drive in this way is that a direct current drive promotes the electrochemical reaction occurring on the surface of the electrodes making up the liquid crystal panels, leading to a marked deterioration in the electrodes. The difference in common voltage when it is reversed field by field or frame by frame is referred to as common voltage amplitude.

Figure 3:
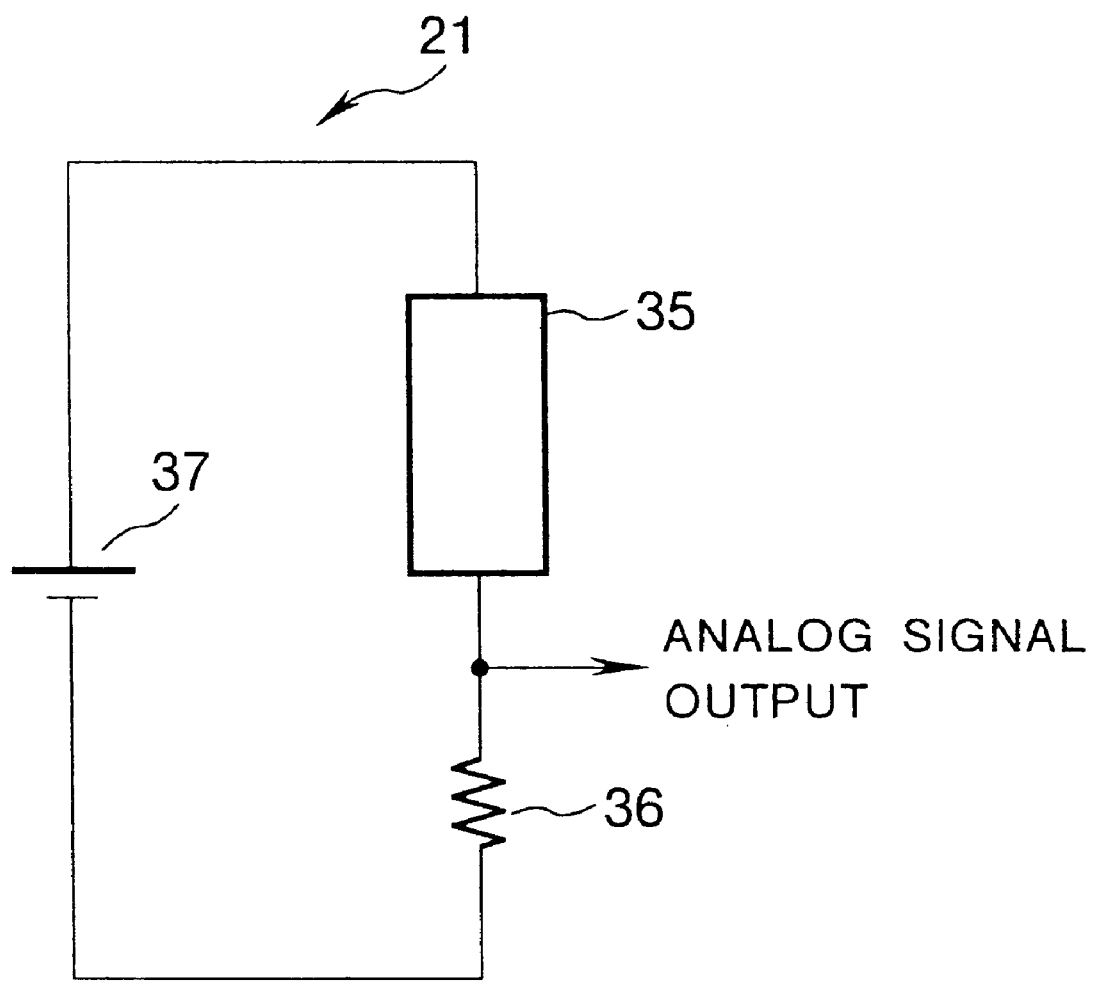
FIG. 3 is a circuit diagram schematically showing the structure of temperature detector 21 shown in FIG. 1.

FIG. 3 is a circuit diagram schematically showing the structure of the temperature detector 21. As shown in FIG. 3, the temperature detector 21 has a resistor 35, of which the resistance varies greatly with temperature (in other words, which has high temperature-dependence), a resistor 36 of extremely small temperature-dependence, which is connected in series to the resistor 35, and a DC power source 37, which applies a constant voltage to both ends of the series-connected resistors 35 and 36. The resistor 36 has a substantially constant resistance that has been previously measured, and the resistor 35 has a temperature vs. resistance characteristic that has been previously measured. The temperature detectors 22, 23 and 24 have a structure identical to that of the temperature detector 21.

Figure 4:
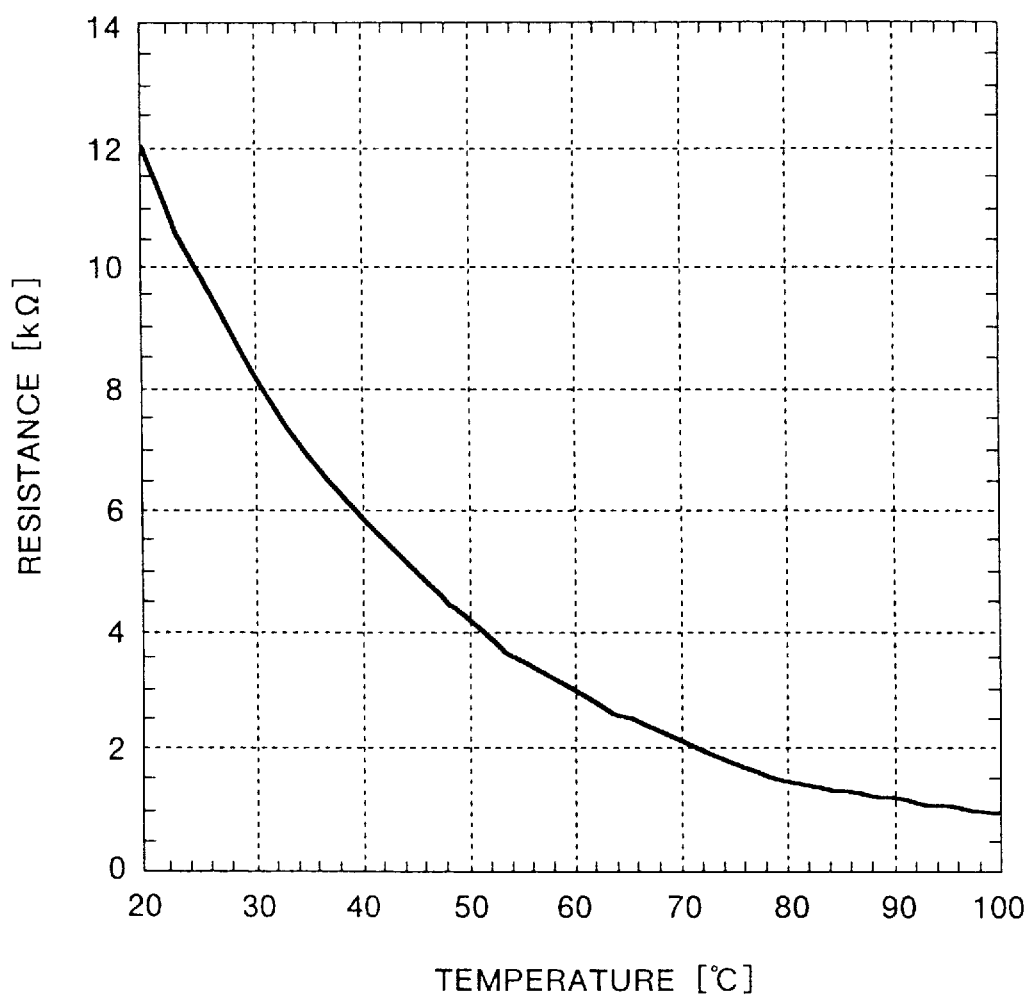
FIG. 4 is a graph showing the temperature characteristic of the resistance of resistor 35 of large temperature-dependence, which is shown in FIG. 3.

FIG. 4 is a graph showing the temperature [° C.] vs. resistance [kΩ] characteristic of the resistor 35 which is shown in FIG. 3. In the temperature detector 21, the electrical potential of the point at which the resistor 35 and the resistor 36 are connected (the mid point) is output as an analog signal. This analog signal varies according to the resistance of the resistor 35, which varies with temperature. The temperature detectors 22, 23 and 24 also output analog signals in the same way as the temperature detector 21.

As shown in FIG. 2, the analog signals output from the temperature detectors 21, 22, 23 and 24 are converted to digital signals by the A-D converters 26, 27, 28 and 29 and are input to the controller 30. The controller 30 controls the cooling capacity of the light source cooling fan 19 on the basis of the values detected by the temperature detector 21, which detects temperature in the vicinity of the light source 1. The controller 30 also controls the cooling capacity of the liquid crystal panel cooling fan 20 on the basis of the values detected by the temperature detectors 22, 23 and 24, which detect temperature in the vicinity of the liquid crystal panels 12, 13 and 14.

Figure 5:
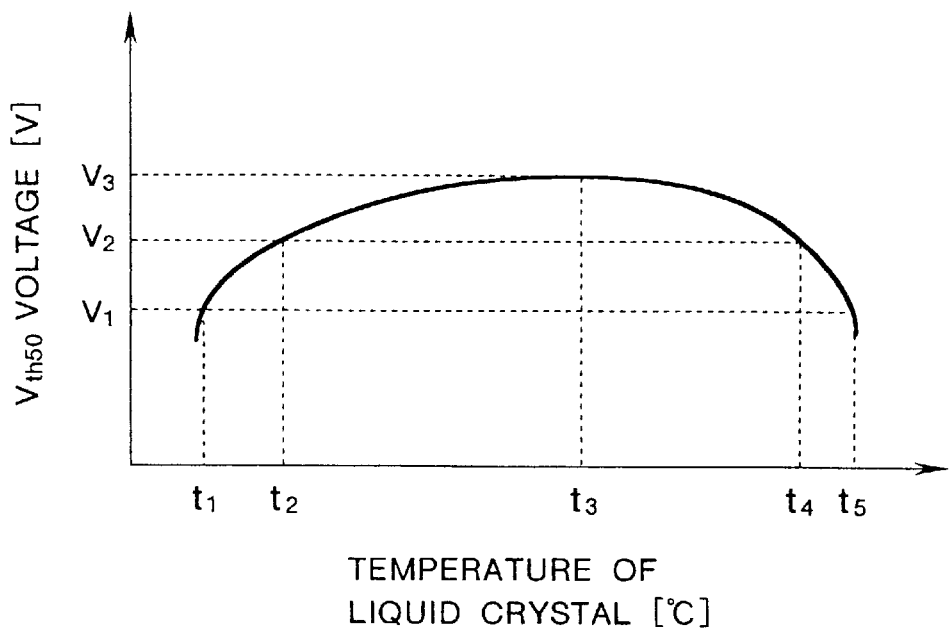
FIG. 5 is a characteristic diagram showing the way in which the applied voltage Vth50 (the voltage at which the optical transmittance becomes 50 [%]) changes with temperature for a liquid crystal panel made of LCPC.

FIG. 5 is a characteristic (hereinafter referred to as "Vth50 characteristic") diagram showing the way in which the applied voltage Vth50, which is the voltage at which the optical transmittance becomes 50 [%], changes with temperature for the liquid crystal panel made of LCPC material. As shown in FIG. 5, the applied voltage Vth50 at which the optical transmittance becomes 50 [%] is V1 when temperature is t1 or t5 and V2 when temperature is t2 or t4, and reaches a maximum of V3 when temperature is t3. Thus it can be seen from FIG. 5 that when the applied voltage is constant, the light transmittance of the liquid crystal panel made of LCPC material is lowest when temperature is t3 (since Vth50 is high), and that it becomes higher as the temperature rises above or falls below t3 (since Vth50 is low).

Figure 6:
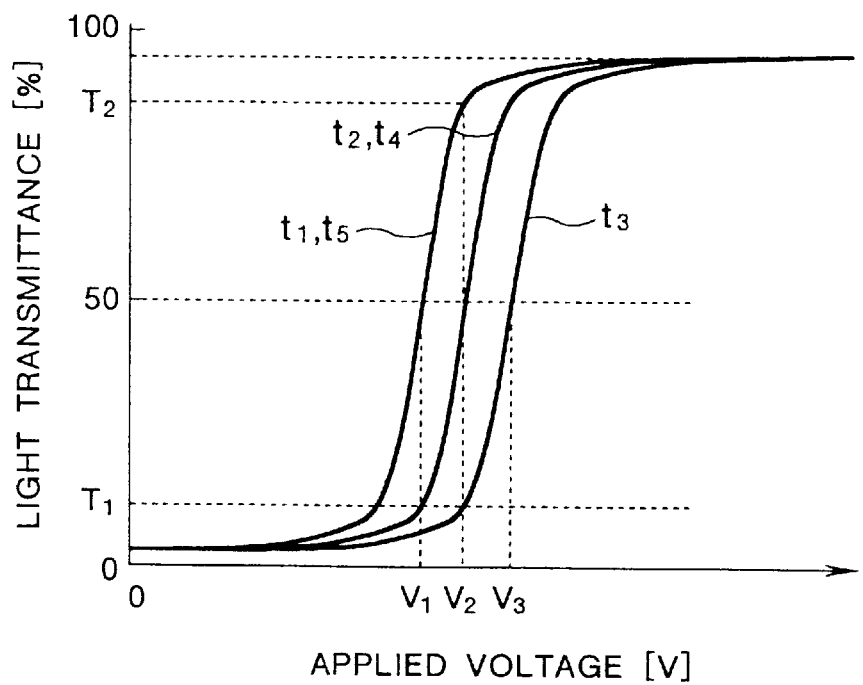
FIG. 6 is a characteristic diagram showing the relationship between applied voltage [V] and light transmittance [%] for a liquid crystal panel made of LCPC.

FIG. 6 is a characteristic diagram showing the relationship between applied voltage [V] vs. light transmittance [%] for the liquid crystal panel made of LCPC material. As shown in FIG. 6, this liquid crystal panel has a characteristic such that its light transmittance is minimized (that is to say, it is normally black) when the applied voltage is 0 [V], and that its light transmittance rises as the applied voltage increases. Further, as shown in FIG. 6, the applied voltage vs. light transmittance characteristic of the liquid crystal panel shifts on the basis of the temperature of the liquid crystal panel. Stated in another way, if the temperature of the liquid crystal panel changes, the light transmittance will vary even at the same applied voltage. For example, at applied voltage V2, the light transmittance will increase in the order T1 [%], 50 [%], T2 [%], when the temperature of the liquid crystal panel rises in the order t3, t4, t5. And at applied voltage V2, the light transmittance will also increase in the order T1 [%], 50 [%], T2 [%] when the temperature of the liquid crystal panel drops in the order t3, t2, t1.

Since, as shown in FIG. 6, the light transmittances of the liquid crystal panels 12, 13 and 14 vary according to the temperatures of the liquid crystal panels 12, 13 and 14, the controller 30 controls the common voltage amplitude applied by the drive circuits 32, 33 and 34 to the common electrode on the basis of the values detected by the temperature detectors 22, 23 and 24, in such a way that the light transmittances of the liquid crystal panels 12, 13 and 14 do not vary greatly even if the temperatures of the liquid crystal panels 12, 13 and 14 vary.

Figure 7:
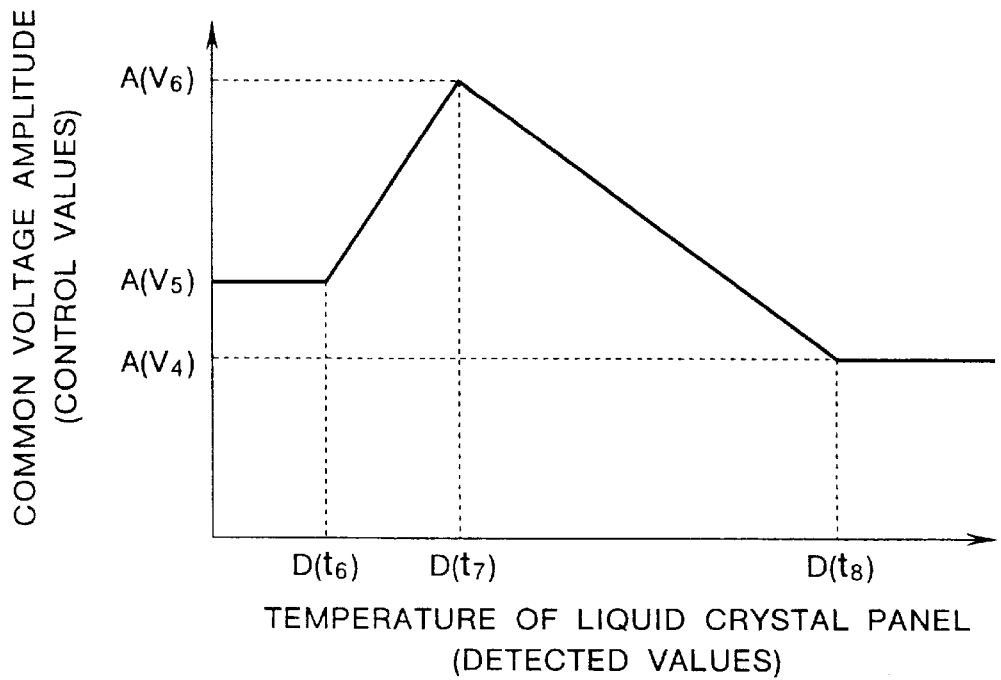
FIG. 7 is a graph showing the control values used for controlling the common voltage amplitude which decreases fluctuation in light transmittance due to changes in the temperature of a liquid crystal panel.

FIG. 7 is a graph showing the control value used in controlling the common voltage amplitude in order that the light transmittances of the liquid crystal panels 12, 13 and 14 do not vary greatly when the temperatures of the liquid crystal panels 12, 13 and 14 vary. As shown in FIG. 7, when the values detected (for example, the average of the detected values) by the temperature detectors 22, 23 and 24 is less than D(t6), the control value fetched by the controller 30 from the memory 31 is fixed at control value A(V5), at which the common voltage amplitude is V5. Be it here noted that D(t) represents a voltage signal output from the temperature detector that detects a temperature t, and that A(V) represents a control value such that the common voltage amplitude is V.

As shown in FIG. 7, when the value detected by the temperature detectors 22, 23 and 24 is in the interval from D(t6) to D(t7), the control value is a calculated value obtained by linear interpolation (first order approximation) of control value A(V5) at detected value D(t6) and of control value A(V6) at detected value D(t7). Again, when the detected value is in the interval from D(t7) to D(t8) the control value is a calculated value obtained by linear interpolation (first order approximation) of control value A(V6) at detected value D(t7) and of control value A(V4) at detected value D(t8). When the detected value is greater than D(t8), the control value is fixed at A(V4).

For example, let us assume that when the operating environment temperature of the projection-type liquid crystal display device is from 5 [° C.] to 40 [° C.], the temperatures detected (for example, the average of the detected temperatures) by the temperature detectors 22, 23 and 24 are t6, t7 and t8. In the vicinity of the detected temperature t6, the image-forming surface of the liquid crystal panel is cool, and the liquid crystal panel cooling fan 20 is deactivated. In this case, the Vth50 of the liquid crystal panel itself will be in the vicinity of t1 or in a region lower than t1 in FIG. 5. Accordingly, even if the applied voltage is the same, the light transmittance of the liquid crystal panel will be higher than it would be in the vicinity of temperature t3, with the result that control is applied to decrease the common voltage amplitude.

In FIG. 7, at the point at which the detected temperature reaches t7, the Vth50 characteristic of the liquid crystal panel itself will be in the vicinity of t3 in FIG. 5. If the detected temperature rises from t6 to t7, the light transmittance will be lower even at the same applied voltage. To suppress this fluctuation in light transmittance, the optimum common voltage amplitude V6 is set for the detected temperature t7, and in the interval from the detected temperature t6 to t7, control is carried out by a value calculated by linear interpolation (first order approximation) of control values A(V5) and A(V6).

Again, in FIG. 7, if the detected temperature reaches t7 or above, the image-forming surface of the liquid crystal panel exceeds the vicinity of temperature t3, and the Vth50 characteristic of the liquid crystal panel itself are in the region of t4 or t5 in FIG. 5. As a result, light transmittance becomes higher than that in the vicinity of temperature t3, so control is carried out to decrease the common voltage amplitude. At the point at which the detected temperature reaches t8, the Vth50 characteristic of the liquid crystal panel itself is in the vicinity of t5 in FIG. 5. If the detected temperature rises from t7 to t8, the light transmittance will be higher, even at the same applied voltage. To suppress this fluctuation in light transmittance, the optimum common voltage amplitude V4 is set for the detected temperature t8, and in the interval from the detected temperature t6 to t7, control is carried out by a value calculated by linear interpolation (first order approximation) of control values A(V6) and A(V4).

As has been explained above, in the first embodiment, the controller 30 fetches control values A(V5), A(V6) and A(V4) corresponding to the detected temperatures D(t6), D(t7) and D(t8) from the memory 31, uses these control values A(V5), A(V6) and A(V4), to calculate (linearly interpolate) control values corresponding to the detected temperatures, and, based upon the calculated control values, outputs control signals to the drive circuits 32, 33 and 34. Specifically, control is carried out in such a way that common voltage amplitude is maximized when the temperature of the liquid crystal panel is such that light transmittance is lowest, and as the temperature of the liquid crystal panel departs from the temperature at which the light transmittance is lowest, the common voltage amplitude is decreased, so that fluctuation in light transmittance due to changes in the liquid crystal panel temperature is reduced. For this reason, in the projection-type liquid crystal display device according to the first embodiment, it is possible to display a good-quality image in which brightness and contrast are stable even if there is fluctuation in the temperature of the liquid crystal panel.

Second Embodiment

Figure 8:
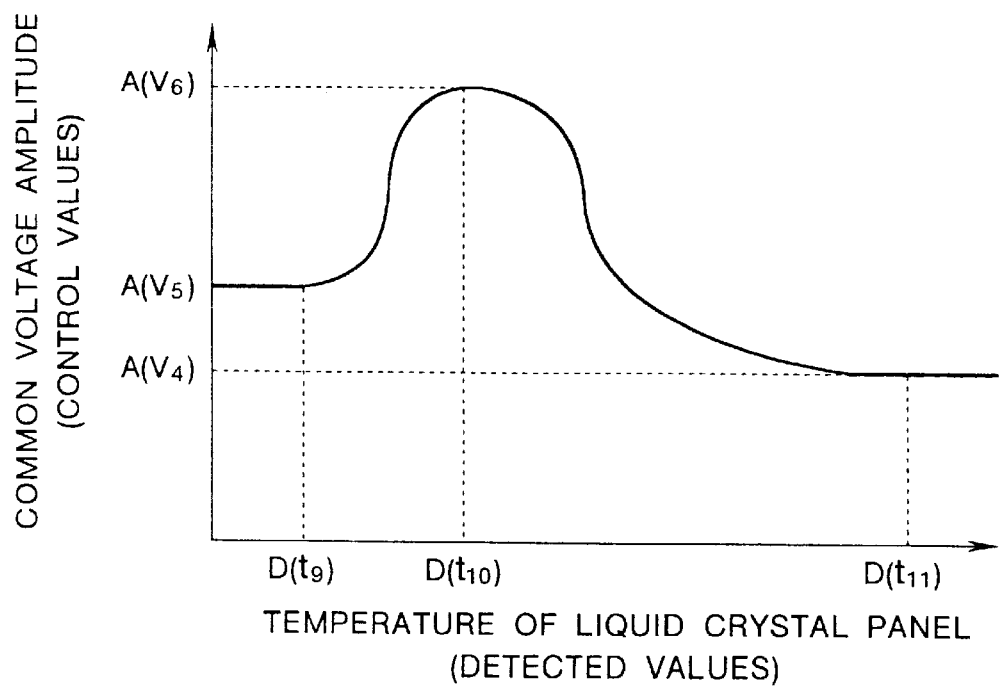
FIG. 8 is a graph showing the control values stored in the memory 31 for a projection-type liquid crystal display device according to a second embodiment of the present invention.

FIG. 8 is a graph showing the control values stored in the memory 31 for a projection-type liquid crystal display device according to a second embodiment of the present invention. With the exception of the content of control by the controller 30 and the control values stored in the memory 31, the projection-type liquid crystal display device according to the second embodiment is identical to the device according to the above-described first embodiment.

In the above-described first embodiment, as shown in FIG. 7, there are stored in the memory 31 three control values D(t6), D(t7) and D(t8), and the common voltage amplitude is controlled using the control values obtained by linear interpolation among the control values D(t6), D(t7) and D(t8), but in the second embodiment, the number of the control values stored in the memory 31 is increased, as shown, for example, in FIG. 8, rendering linear interpolation at the controller 30 unnecessary.

As has been described above, in the second embodiment, the controller 30 fetches the control values corresponding to the detected values of temperature, outputs control signals based on these control values to drive circuits 32, 33 and 34, and carries out control such that, the common voltage amplitude is maximized when the temperature of the liquid crystal panel is that at which light transmittance is lowest, and the common voltage amplitude is reduced as the temperature of the liquid crystal panel diverges from that at which light transmittance is lowest, thereby reducing fluctuation in light transmittance due to changes in the temperature of the liquid crystal panel. Thus in the projection-type liquid crystal display device according to the second embodiment, it is possible to display a good-quality image in which brightness and contrast are stable. Moreover, it should be noted that with the exception of the points described above, the second embodiment is identical to the above-described first embodiment.

Third Embodiment

Figure 9:
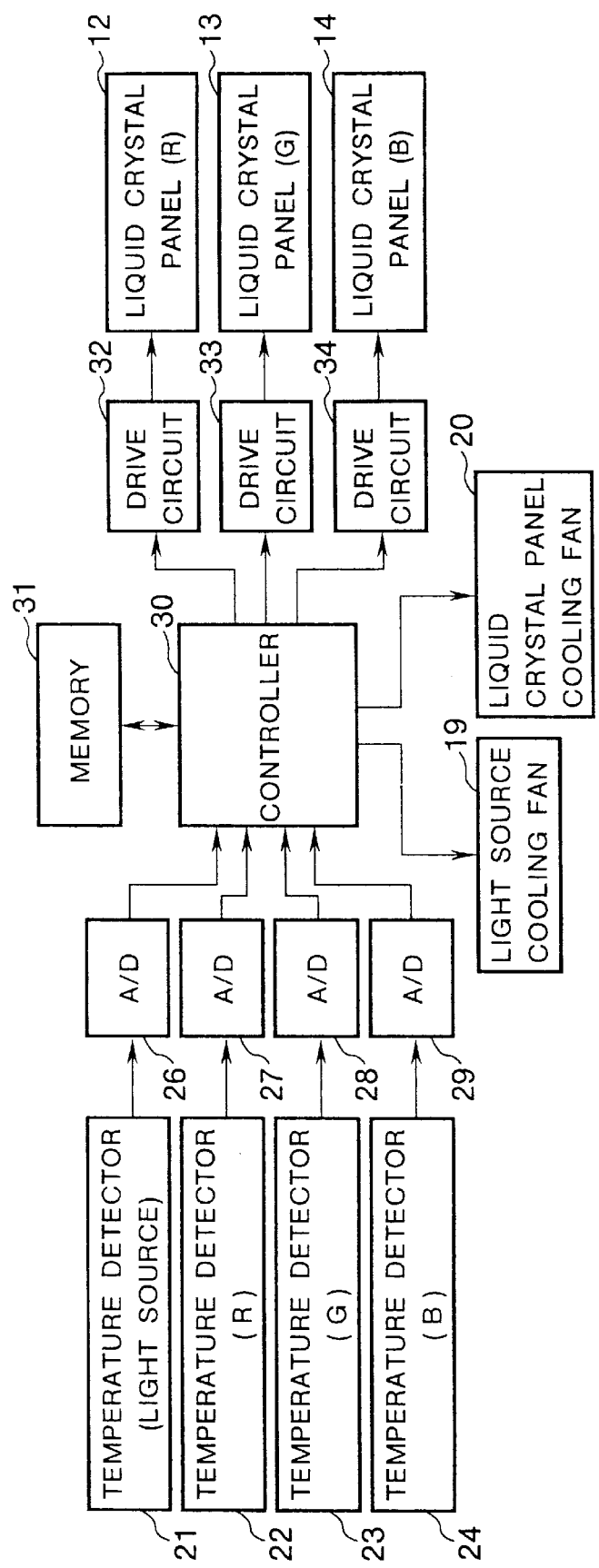
FIG. 9 is a block diagram showing the structure of the control system of a projection-type liquid crystal display device according to a third embodiment of the present invention.

FIG. 9 is a block diagram of the structure of the control system of a liquid crystal display device according to a third embodiment of the present invention. Those structures in FIG. 9 that are identical to structures in FIG. 2 are assigned identical symbols. In the projection-type liquid crystal display device according to the third embodiment, the content of control by the controller 30 and the control values stored in the memory 31 differ from those in the above-described first embodiment.

Specifically, as shown in FIG. 9, in the projection-type liquid crystal display device of the third embodiment, the common voltage amplitudes applied to the common electrodes of the liquid crystal panels 12, 13 and 14 are individually controlled on the basis of the values detected, respectively, by the temperature detectors 22, 23 and 24, which detect the temperatures in the vicinity of the liquid crystal panels 12, 13 and 14, so as to reduce fluctuation in the light transmittances of the liquid crystal panels 12, 13 and 14. A method of controlling the common voltage amplitude may include, for example, the method shown in FIG. 7 using the control values of the first embodiment or the method shown in FIG. 8 using the control values of the second embodiment.

Since, as has been described above, in the projection-type liquid crystal display device of the third embodiment, the common voltage amplitudes of the liquid crystal panels 12, 13 and 14 are controlled individually, it is possible to compensate appropriately for differences in the applied voltage vs. light transmittance characteristic caused by differences in the wavelength dependence of the various liquid crystal panels or by differences in temperature or other operating environment conditions. Thus in the projection-type liquid crystal display device of the third embodiment, it is possible to display a good-quality image in which brightness and contrast are stable. Moreover, it should be noted that with the exception of the points described above, the third embodiment is identical to the abovedescribed first embodiment.

Fourth Embodiment

Figure 10:
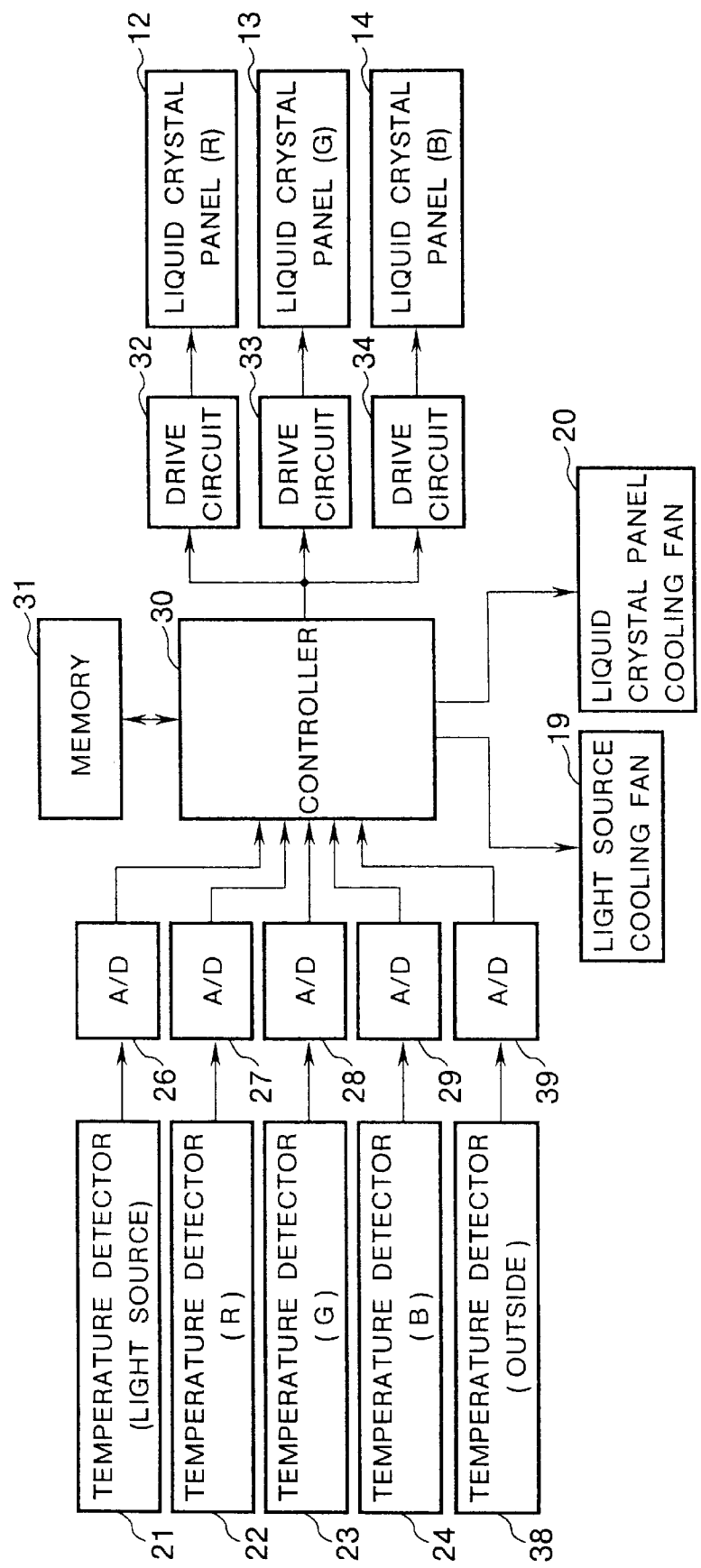
FIG. 10 is a block diagram showing the structure of the control system of a projection-type liquid crystal display device according to a fourth embodiment of the present invention.

FIG. 10 is a block diagram of the structure of the control system of a liquid crystal display device according to a fourth embodiment of the present invention. Those structures in FIG. 10 that are identical to structures in FIG. 2 are assigned identical symbols. As shown in FIG. 10, the projection-type liquid crystal display device of the fourth embodiment differs from a projection-type liquid crystal display device of the above-described first embodiment in that it has a temperature detector 38 that detects temperature external to the device and an A-D converter 39 that converts the analog signal output from the temperature detector 38 into a digital signal, and in that the content of control by the controller 30 is different. The structure of the temperature detector 38 is identical to that of the temperature detector 21 shown in FIG. 3.

Figure 11:
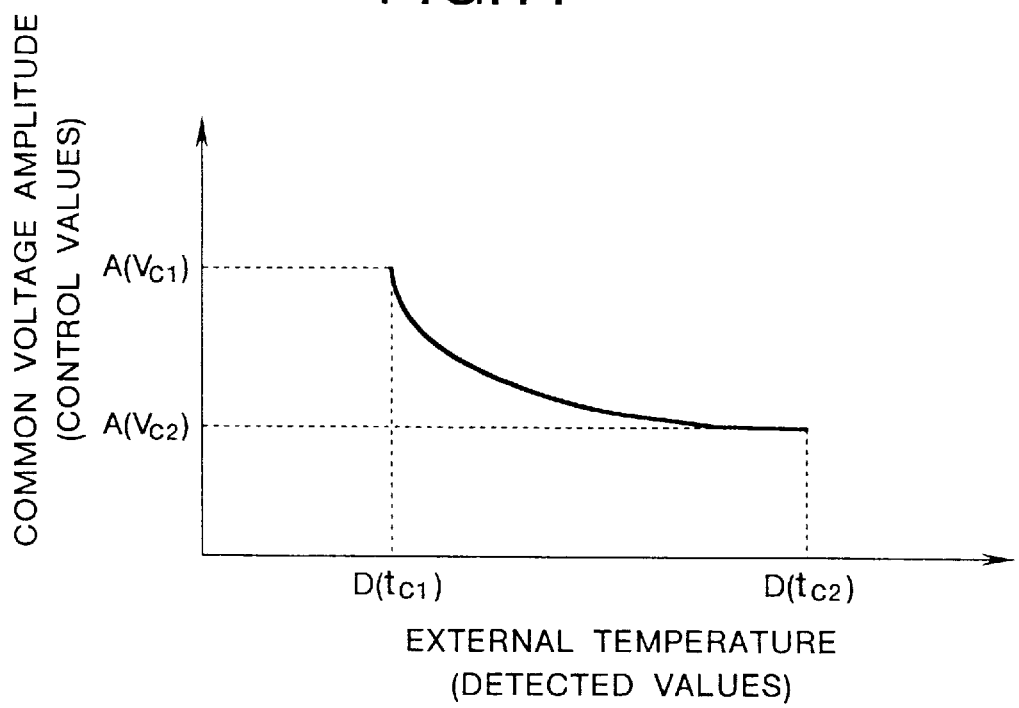
FIG. 11 is a graph showing the control values additionally stored in the memory 31 shown in FIG. 10.

FIG. 11 is a graph showing the control values for the common voltage amplitude corresponding to external temperature, which is stored in the memory 31 of the projection-type liquid crystal display device of the fourth embodiment. In FIG. 11, Vc1 and Vc2 represent common voltage amplitudes and A(Vc1) and A(Vc2) represent the control values that cause the common voltage amplitudes to be Vc1 and Vc2. Further, in FIG. 11, tc1 and tc2 represent temperatures external to the device, and D(tc1) and D(tc2) represent the values detected by the temperature detector 38, which detects external temperatures tc1 and tc2.

As shown in FIG. 11, in the projection-type liquid crystal display device of the fourth embodiment, when the value detected by external temperature detector 38 is within the range from D(tc1) through D(tc2) (that is to say when the external temperature is within the range from tc1 to tc2 and the external temperature is assumed to be low), the liquid crystal panel cooling fan 20 is deactivated, and, on the basis of the values detected by the temperature detector 38, the control values for common voltage amplitude A(Vc1) through A(Vc2) are fetched from the memory 31. Then, by correcting the common voltage amplitudes of the liquid crystal panels 12, 13 and 14, compensation for the shift in the applied voltage vs. light transmittance characteristic is provided on the basis of the control values fetched.

In the fourth embodiment, as described above, the liquid crystal panel cooling fan 20 is deactivated when the external temperature is low, and compensation for fluctuation in light transmittance resulting from the rise in temperature is provided by changing the common voltage amplitude, with the result that it is possible to eliminate the problem of major fluctuation in the light transmittance of the liquid crystal panels 12, 13 and 14 when the image-forming surface of these liquid crystal panels are cooled to excess by cool air introduced by the liquid crystal panel cooling fan 20. Thus in the projection-type liquid crystal display device of the fourth embodiment, it is possible to display a good-quality image in which brightness and contrast are stable even when the external temperature is low. Moreover, it should be noted that with the exception of the points described above, the fourth embodiment is identical to the above-described first embodiment.

Fifth Embodiment

With the exception of control values stored in the memory 31 and the content of control by the controller 30, a projection-type liquid crystal display device according to a fifth embodiment of the present invention has structures that are identical to those of the device shown in FIG. 2. Accordingly, reference is also made to FIG. 2 in the description of the fifth embodiment.

Figure 12:
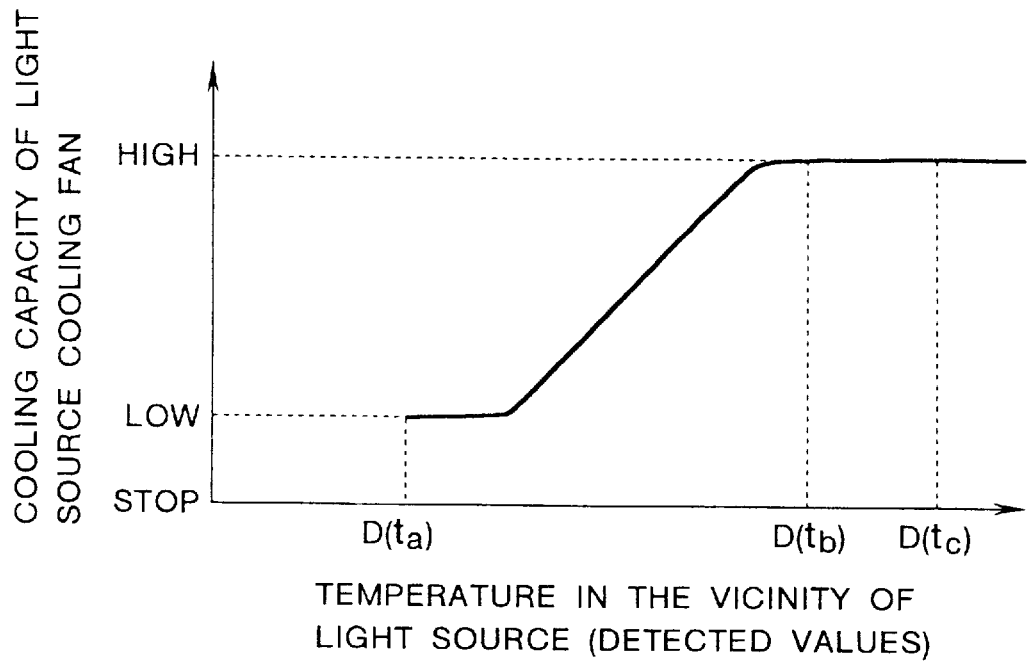
FIG. 12 is a graph showing the control values additionally stored in the memory 31 according to a fifth embodiment of the present invention.

FIG. 12 is a graph showing the control values stored in the memory 31 of the projection-type liquid crystal display device according to the fifth embodiment. These control values show the relationship between the values detected by the temperature detector 21, which detects the temperature in the vicinity of the light source 1 and the cooling capacity of the light source cooling fan 19. In FIG. 12, ta, tb and tc represent temperatures in the vicinity of the light source 1 respectively, and D(ta), D(tb) and D(tc) represent the values detected by the temperature detector 21 at temperatures ta, tb and tc respectively.

In the fifth embodiment, the controller 30 fetches from the memory 31 the control values relating to the cooling capacity of the light source cooling fan 19 and corresponding to the values detected by the temperature detector 21, which detects temperature in the vicinity of the light source 1, and, on the basis of the control values fetched, adjusts the cooling capacity of the light source cooling fan 19.

Thus, in the fifth embodiment, when the temperature of the environment in which the device is installed is extremely low, so that the heat produced by the light source 1 has no adverse effect upon peripheral structures (that is to say, when the value detected by the temperature detector 21 is smaller that D(ta)), the light source cooling fan 19 is deactivated, and when the value detected by the temperature detector 21 reaches D(ta) (that is to say, when it becomes likely that the heat produced by the light source 1 may have an adverse effect upon peripheral structures), the light source cooling fan 19 is operated at its lowest operating capacity (minimum torque). Again, when the value detected by the temperature detector 21 exceeds D(ta), the cooling capacity of the light source cooling fan 19 is increased, carrying out control such that the temperature in the vicinity of the light source 1 is held constant and unchanging. In the region in which the value detected by the temperature detector 21 is at or above D(tb), however, since the cooling capacity of the light source cooling fan 19 has already reached its highest operating capacity (maximum torque), it becomes impossible to maintain a constant temperature in the vicinity of the light source 1. Accordingly, in the event that the temperature detector 21 detects temperature tc, which is prior to that at which the temperature in the vicinity of the light source 1 exerts an adverse effect on peripheral structures, and outputs detected value D(tc), the light source 1 is extinguished by a temperature switch or other separate control unit (not shown in the figures).

As described above, according to the fifth embodiment, when the temperature of the light source 1 is sufficiently low, needless cooling operation of the light source cooling fan 19 is avoided, so that it is possible to reduce noise due to the light source cooling fan 19. This is particularly advantageous in applications when quiet operation is desired, such as when the projection-type liquid crystal display device is to be used in making academic, commercial or other presentations. Moreover, it should be noted that with the exception of the points described above, the fifth embodiment is identical to the above-described first embodiment.

Sixth Embodiment

With the exception of the control values stored in the memory 31 and the content of control by the controller 30, a projection-type liquid crystal display device according to a sixth embodiment of the present invention has structures that are identical to those of the device shown in FIG. 2. Accordingly, reference is also made to FIG. 2 in the description of the sixth embodiment.

Figure 13:
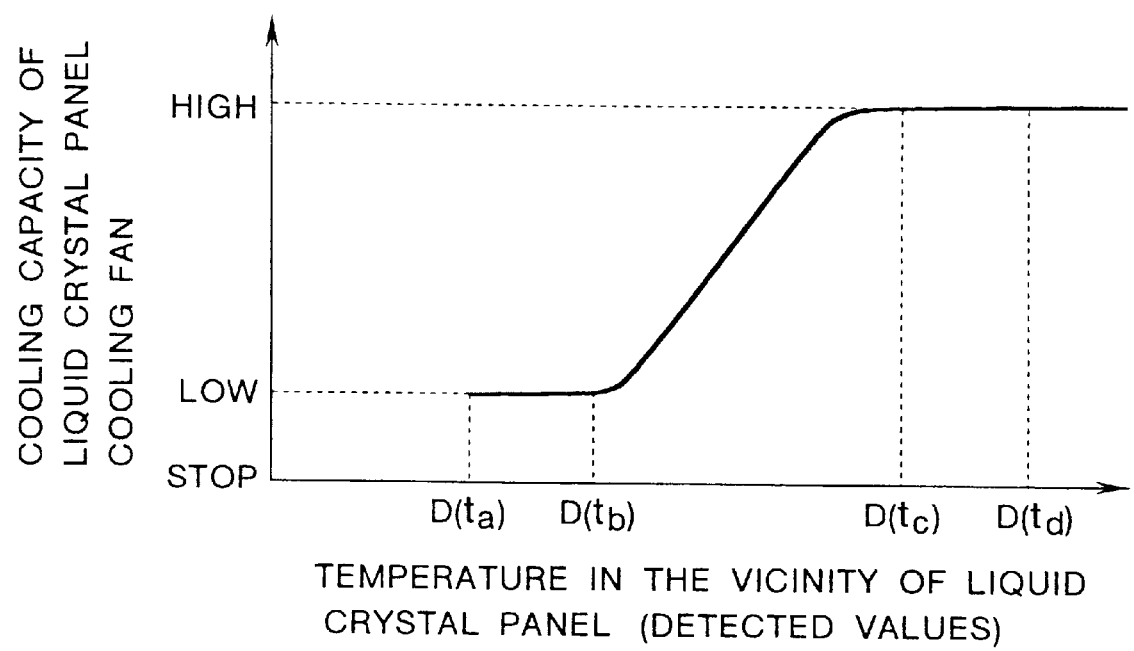
FIG. 13 is a graph showing the control values additionally stored in the memory 31 according to a sixth embodiment of the present invention.

FIG. 13 is a graph showing the control values stored in the memory 31 of the projection-type liquid crystal display device according to the sixth embodiment. These control values show the relationship between the values detected by the temperature detectors 22, 23 and 24, which detect the temperature in the vicinity of the liquid crystal panels 12, 13 and 14, and the cooling capacity of the liquid crystal panel cooling fan 20. In FIG. 13, ta, tb, tc and td represent temperatures in the vicinity of the liquid crystal panels respectively, and D(ta), D(tb), D(tc) and D(td) represent the values detected (for example, the average of the detected values) by the temperature detectors 22, 23 and 24 at temperatures ta, tb, tc and td respectively.

As was described in the first embodiment, a liquid crystal panel made of LCPC has the applied voltage vs. light transmittance characteristic shown in FIG. 6. To compensate for the shift in the applied voltage vs. light transmittance characteristic caused by changes in the temperature of the image-forming surfaces of these liquid crystal panels, there exists a method, described in the first embodiment, in which control is carried out with respect to the common voltage amplitude, but in the sixth embodiment, the shift in applied voltage vs. light transmittance characteristic is suppressed by controlling the cooling capacity of the liquid crystal panel cooling fan 20 to control the temperature of the liquid crystal panels 12, 13 and 14. In accordance with the values detected (for example, the average of them) by the temperature detectors 22, 23 and 24, which detect temperatures in the vicinity of the liquid crystal panels 12, 13 and 14, the cooling capacity of the liquid crystal panel cooling fan 20 such that the image-forming surfaces of the liquid crystal panels 12, 13 and 14 may be kept at the optimum operating temperature is fetched from the memory 31, and the liquid crystal panel cooling fan 20 is operated at this cooling capacity.

Specifically, when the ambient temperature of the projection-type liquid crystal display device is extremely low, the liquid crystal panel cooling fan 20 is deactivated so that the temperature of the image-forming surfaces of the liquid crystal panels 12, 13 and 14 rises (for example, to temperature t1 or above in FIG. 5). Thereafter, even if the liquid crystal panel cooling fan 20 is operated at low cooling capacity (minimum torque) by means of the temperature detectors 22, 23 and 24, once temperature ta (detected value D(ta), at which the temperature of the image-forming surfaces of the liquid crystal panels 12, 13 and 14 fails to drop below the desired temperature (for example, does not go below temperature t1 in FIG. 5) is detected, the liquid crystal panel cooling fan 20 is operated at low cooling capacity.

Further, the region from detected values D(ta) through D(tb) in FIG. 13 is the region within which the image-forming surfaces of the liquid crystal panels 12, 13 and 14 will not exceed the desired temperature (for example, temperature t3 in FIG. 5), even if the liquid crystal panel cooling fan 20 is operated at low cooling capacity. When the detected value exceeds D(tb) in FIG. 13, the cooling capacity of the liquid crystal panel cooling fan 20 is increased to maintain the temperature of the image-forming surfaces of the liquid crystal panels 12, 13 and 14 at temperature t3 in FIG. 5. At the point at which the detected value reaches D(tc) in FIG. 13, the liquid crystal panel cooling fan 20 reaches high cooling capacity (maximum torque operation). Accordingly, in the region of detected values D(tc) through D(td) in FIG. 13, the liquid crystal panel cooling fan 20 remains at high-power operation, and when the detected value reaches D(td), the temperature of the image-forming surfaces of the liquid crystal panels 12, 13 and 14 reaches, for example, temperature t5 in FIG. 5. When, in FIG. 13, the detected temperature is higher than td and the liquid crystal panels 12, 13 and 14 are at a temperature sufficiently lower than the temperature at which operation is impossible, a temperature switch or other separate control unit is activated, and the light source 1, which is the largest producer of heat in the projection-type liquid crystal display device, is extinguished. Thus the liquid crystal panels 12, 13 and 14 cannot reach a situation in which operation is impossible due to heat. Moreover, it should be noted that with the exception of the points described above, the sixth embodiment is identical to the above-described first embodiment.

Seventh Embodiment

With the exception of the content of control by the controller 30, a projection-type liquid crystal display device according to a seventh embodiment of the present invention has structures that are identical to those of the device shown in FIG. 2. Accordingly, reference is made to FIG. 2 in the description of the seventh embodiment.

In the seventh embodiment, when the value detected (for example, the average of the detected values) by the temperature detectors 22, 23 and 24, which detect temperature in the vicinity of the liquid crystal panels 12, 13 and 14, undergoes a variation per unit change in time $\Delta t$ (for example, $\Delta t=0.1$ seconds, and hereinafter described in terms of $\Delta t=0.1$ seconds) from $D(t-0.1)$ to $D(t)$, and when the absolute value of the variation per unit time $|D(t)-D(t-0.1)|$ is greater than a specified reference value Dth, the common voltage amplitude is controlled on the basis of the detected value $D(t)$ at time t. On the other hand, when the absolute value $|D(t)-D(t-0.1)|$ it is equal to or less than the specified reference value Dth, the common voltage amplitude is held constant and unchanging.

Finally, the detected value $D(t')$ when the common voltage amplitude is changed is stored. Then, when the absolute value of the variation per unit time $|D(t)-D(t-0.1)|$ is equal to or less than the specified reference value Dth and control in which the common voltage amplitude is held constant and unchanging is repeated for several iterations (for example, 1 seconds later after ten iterations), and when the absolute value of the variation of detected values $D(t)$ and $D(t')$ at that time $|D(t)-D(t')|$ is greater than specified reference value Dth', the common voltage amplitude is controlled on the basis of the detected value $D(t)$ at that time, and when the absolute value $|D(t)-D(t')|$ is equal to or less than reference value Dth', the common voltage amplitude is held constant and unchanging.

When the common voltage amplitude is changed on the basis of the detected value $D(t)$ and when $|D(t)-D(t-0.1)|$ is greater than the specified reference value Dth, the common voltage amplitude is controlled on the basis of the detected value $D(t)$ at that time, whereas when $|D(t)-D(t-0.1)|$ is equal to or less than the specified reference value Dth, control is carried out in such a way that the common voltage amplitude is held constant and unchanging. When the common voltage amplitude is not changed and when $|D(t)-D(t')|$ is greater than the specified reference value Dth', the common voltage amplitude is controlled on the basis of the detected value $D(t)$ at that time, whereas when $|D(t)-D(t')|$ is equal to or less than the specified reference value Dth', control such that the common voltage amplitude is held constant and unchanging is repeated for each unit of time.

By means of control carried out as described above, it is possible to suppress small, short-cycle fluctuation in the brightness of the projected image. Moreover, it should be noted that with the exception of the points described above, the seventh embodiment is identical to the above-described first embodiment.

Eighth Embodiment

With the exception of the content of control by the controller 30, a projection-type liquid crystal display device according to an eighth embodiment of the present invention has structures that are identical to those of the device shown in FIG. 2. Accordingly, reference is made to FIG. 2 in the description of the eighth embodiment.

When the common voltage amplitude at value T detected by the temperature detector is set at $A(T)$ and the optimum common voltage amplitude for the values $D(t)$ detected (for example, the average of the detected values) by the temperature detectors 22, 23 and 24 at a given time t is $A(D(t))$, and when $|(T)-A(D(t))|$ is smaller than a specified reference value Ath, the common voltage amplitude is changed from the value $A(T)$ set at that time by the amount of the minimum quantized width (that is, set to $A(T+1)$ when the amplitude is to be increased, and to $A(T-1)$ when the amplitude is to be decreased), whereas, when $|A(T)-A(D(t))|$ is equal to or greater than the specified reference value Ath, the common voltage amplitude is set to $A(D(t))$.

Here, the change in minimum quantized width $|A(T+1)-A(T)|$ is set to be so small that it is virtually imperceptible to the eye. Further, the reference value Ath is set to be sufficiently large that, provided there is no abrupt rise in temperature within the projection-type liquid crystal display device at start-up, and no abrupt change in the operating environment temperature, $|A(T)-A(D(t))|$ will not exceed the reference value Ath. By means of control carried out as described above, it is possible to achieve rapid setting of the appropriate common voltage in cases where the response speed produced by changes in minimum quantized width is too slow, as when there is an abrupt rise in the temperature within the device or an abrupt change in the operating environment temperature. Moreover, it should be noted that with the exception of the points described above, the eighth embodiment is identical to the above-described first embodiment.

Ninth Embodiment

Figure 14:
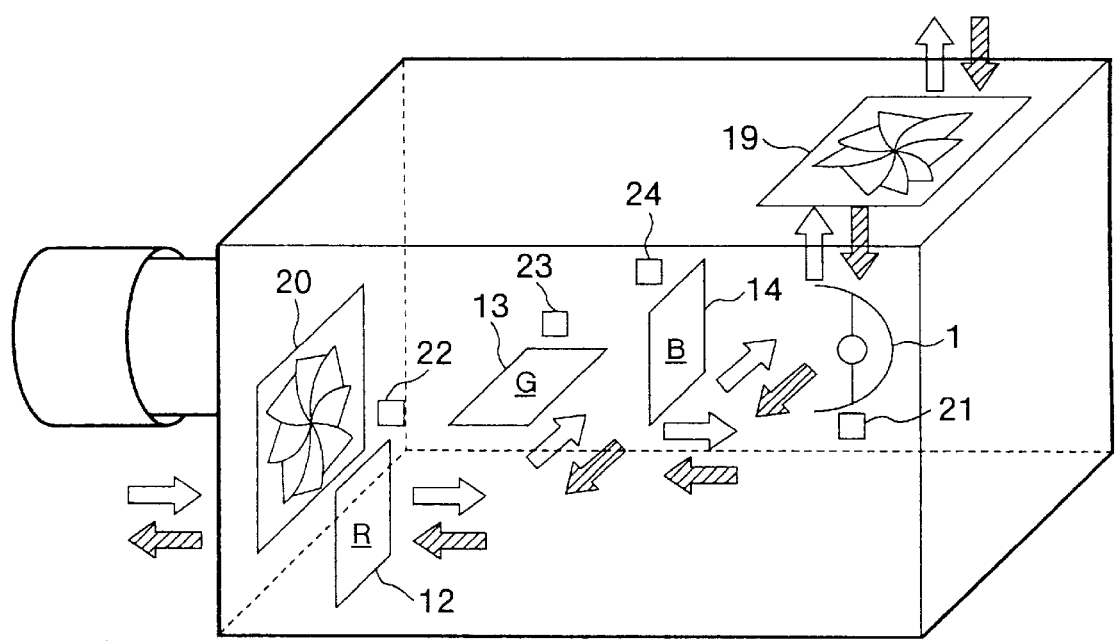
FIG. 14 is a diagram showing in conceptual terms the air paths in a projection-type liquid crystal display device according to a ninth embodiment of the present invention.

FIG. 14 is a diagram showing in conceptual terms the air paths (paths through which the air flows) in a projection-type liquid crystal display device according to a ninth embodiment of the present invention. Those structures in FIG. 14 that are identical to or correspond to structures in FIG. 2 are assigned identical symbols.

When the projection-type liquid crystal display device of the ninth embodiment is operating normally (at steady-state) with the ambient temperature of the device at normal temperature, the light source cooling fan 19 is in exhaust mode and the liquid crystal panel cooling fan 20 is in intake mode, so that air flows in the direction shown by the white arrows. Accordingly, the image-forming surfaces of the liquid crystal panels 12, 13 and 14 come in contact with air introduced from outside by the liquid crystal panel cooling fan 19 and are cooled, and the heat produced by the light source 1 is exhausted to the outside by the light source cooling fan 19.

Further, in cases such as when the ambient temperature of the device is low or immediately after the device has started up, and the temperatures detected (for example, the average of the detected temperatures) by the temperature detectors 22, 23 and 24 is lower than a specified temperature, the rotation of both the light source cooling fan 19 and the liquid crystal panel cooling fan 20 is reversed (that is to say, the light source cooling fan 19 is in intake mode and the liquid crystal panel cooling fan 20 is in exhaust mode), the air flows in the direction shown by the hatched arrows, and the air that has risen in temperature due to the heat produced by the light source 1 comes into contact with the liquid crystal panels 12, 13 and 14, warming the liquid crystal panels 12, 13 and 14. Thus, it is possible to bring the image-forming surfaces of the liquid crystal panels to the optimum operating temperature in a short period of time, even in a low-temperature environment. Moreover, it should be noted that with the exception of the points described above, the ninth embodiment is identical to the above-described first embodiment.

Tenth Embodiment

Figure 15:
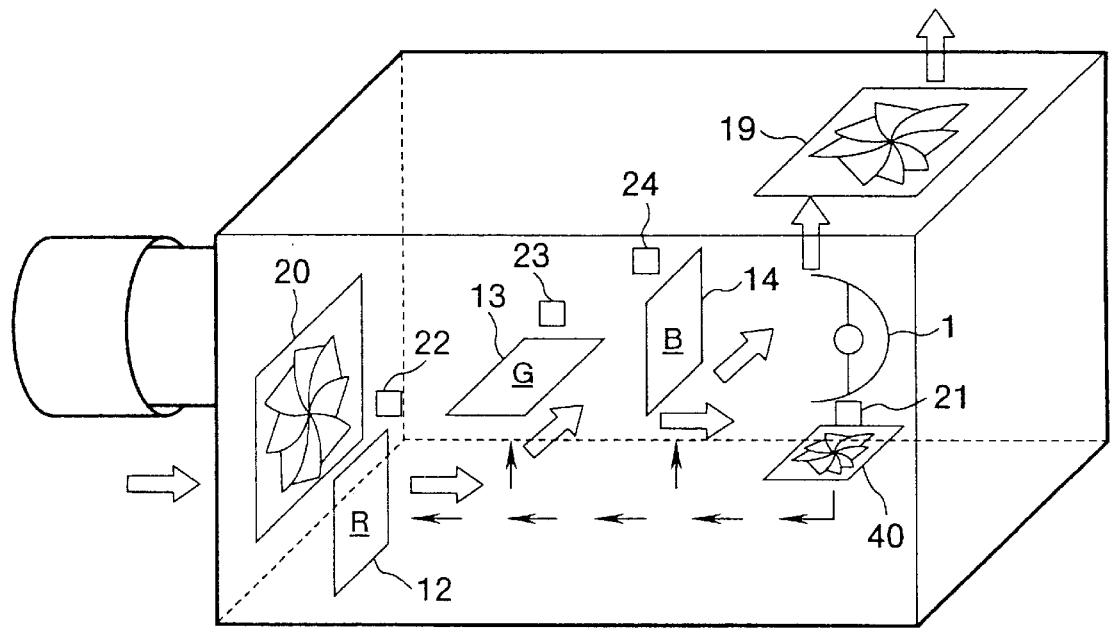
FIG. 15 is a diagram showing in conceptual terms the air paths in a projection-type liquid crystal display device according to a tenth embodiment of the present invention.

FIG. 15 is a diagram showing in conceptual terms the air paths (paths through which the air flows) in a projection-type liquid crystal display device according to a tenth embodiment of the present invention. Those structures in FIG. 15 that are identical to or correspond to structures in FIG. 2 are assigned identical symbols.

As shown in FIG. 15, the projection-type liquid crystal display device of the tenth embodiment has a blower fan 40 that delivers to the liquid crystal panels 12, 13 and 14 air that has risen in temperature due to the heat produced by the light source 1.

When the projection-type liquid crystal display device of the tenth embodiment is operating normally (at steady-state) with the ambient temperature of the device at normal temperature, the light source cooling fan 19 is in exhaust mode and the liquid crystal panel cooling fan 20 is in intake mode, so that air flows in the direction shown by the white arrows. Accordingly, the image-forming surfaces of the liquid crystal panels 12, 13 and 14 come into contact with air introduced from outside by the liquid crystal panel cooling fan 20 and are cooled, and the heat produced by the light source 1 is exhausted to the outside by the light source cooling fan 19.

Further, in cases such as when the ambient temperature of the device is low or when the device has just started up, and the temperature detected (for example, the average of the detected temperatures) by the temperature detectors 22, 23 and 24 is lower than a specified temperature t1, the blower fan 40 is activated, causing the air that has risen in temperature due to the heat produced by the light source 1 to flow in the direction shown by the thin solid arrows, warming the image-forming surfaces of the liquid crystal panels 12, 13 and 14. Then, when the temperature detected by the temperature detectors 22, 23 and 24 (for example, the average of these detected temperatures) rises above specified temperature t2 (where t1 is less than t2), the liquid crystal panel cooling fan 20 is activated, cooling the image-forming surfaces of the liquid crystal panels 12, 13 and 14.

When the detected temperature is between t1 and t2, either the liquid crystal panel cooling fan 20 and the blower fan 40 are both deactivated, or the blower fan 40 only is deactivated and the liquid crystal panel cooling fan 20 is operated intermittently, thereby maintaining the image-forming surfaces of the liquid crystal panels 12, 13 and 14 at the optimum operating temperature. Thus, it is desirable to carry out control in such a way that the liquid crystal panel cooling fan 20 and the blower fan 40, the purposes of which are contrary, are not both operated at the same time. Further, although not shown in FIG. 15, it is desirable that the air paths be separated by a barrier, valve or the like to prevent the flow of air from one of these air paths to the other. As has been described above, it is possible by means of the tenth embodiment, to bring the image-forming surfaces of the liquid crystal panels to the optimum operating temperature in a short period of time, even in a low-temperature environment. Moreover, it should be noted that with the exception of the points described above, the tenth embodiment is identical to the above-described first embodiment.

Eleventh Embodiment

Figure 16:
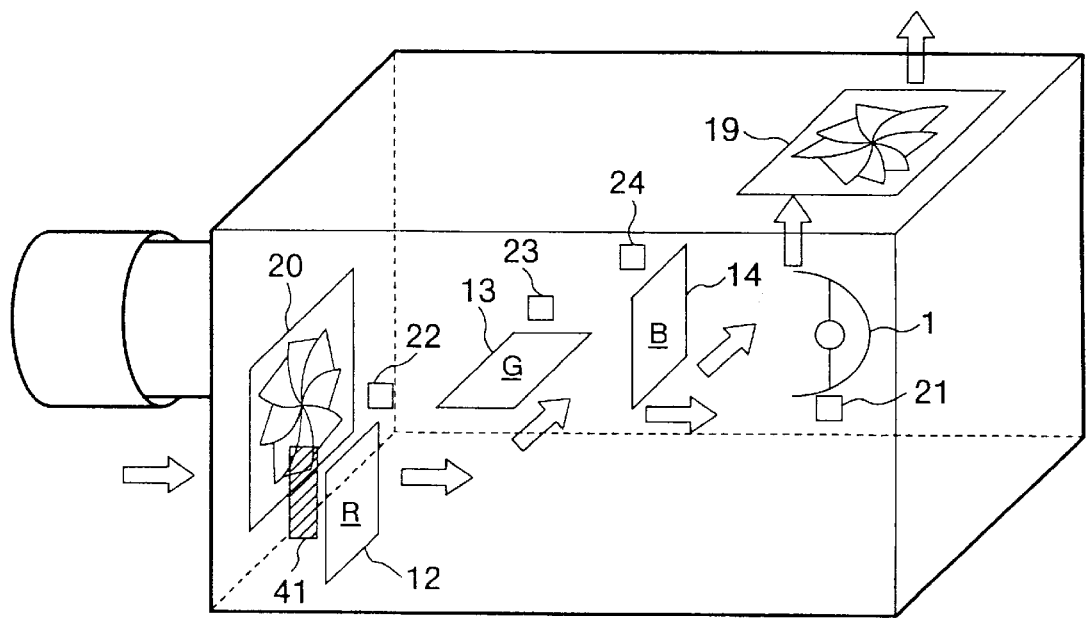
FIG. 16 is a diagram showing in conceptual terms the air paths in a projection-type liquid crystal display device according to an eleventh embodiment of the present invention.

FIG. 16 is a diagram showing in conceptual terms the air paths (paths through which the air flows) in a projection-type liquid crystal display device according to an eleventh embodiment of the present invention. Those structures in FIG. 16 that are identical to or correspond to structures in FIG. 2 are assigned identical symbols.

As shown in FIG. 16, the projection-type liquid crystal display device of the eleventh embodiment is provided with a heater 41 within the air path that communicates with the liquid crystal panels 12, 13 and 14 in the vicinity of the liquid crystal panel cooling fan 20.

When the projection-type liquid crystal display device according to the eleventh embodiment is operating normally (at steady-state) with the ambient temperature of the device at normal temperature, the light source cooling fan 19 is in exhaust mode and the liquid crystal panel cooling fan 20 is in intake mode, so that air flows in the direction shown by the white arrows. Accordingly, the image-forming surfaces of the liquid crystal panels 12, 13 and 14 come into contact with air introduced from outside by the liquid crystal panel cooling fan 20 and are cooled, and the heat produced by the light source 1 is exhausted to the outside by the light source cooling fan 19.

Further, in cases such as when the ambient temperature of the device is low or when the device has just started up, and the temperature detected (for example, the average of the detected temperatures) by the temperature detectors 22, 23 and 24 is lower than a specified temperature, the heater 41 is activated and the heat produced by the heater 41 is delivered by the liquid crystal panel cooling fan 20 to the liquid crystal panels 12, 13 and 14, warming the image-forming surfaces of the liquid crystal panels 12, 13 and 14. Thus, it is possible to bring the image-forming surfaces of the liquid crystal panels to the optimum operating temperature in a short period of time, even in a low-temperature environment. Moreover, it should be noted that with the exception of the points described above, the eleventh embodiment is identical to the above-described first embodiment.

Twelfth Embodiment

Figure 17:
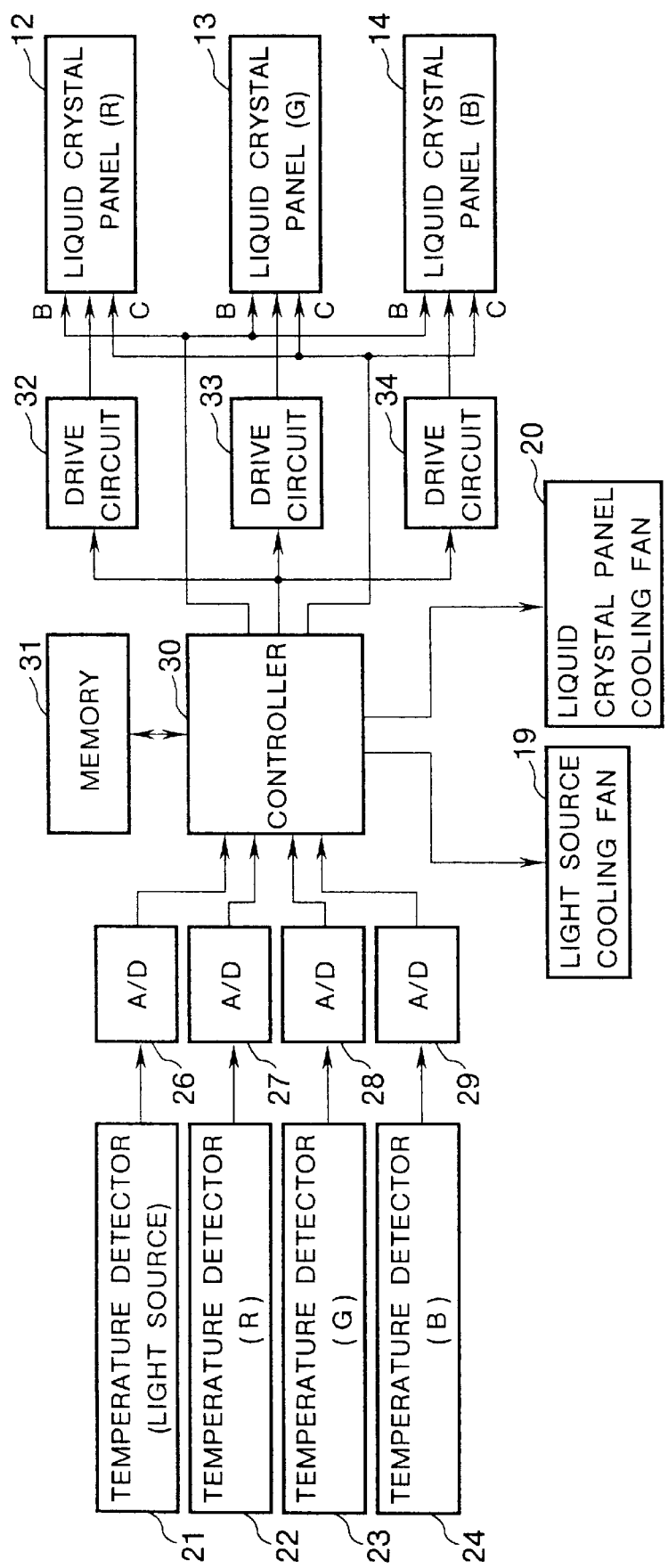
FIG. 17 is a block diagram showing the structure of the control system of a projection-type liquid crystal display device according to a twelfth embodiment of the present invention.

FIG. 17 is a block diagram showing the structure of the control system of a projection-type liquid crystal display device according to a twelfth embodiment of the present invention. Those structures in FIG. 17 that are identical to or correspond to structures in FIG. 2 are assigned identical symbols. In the twelfth embodiment, the content of control by the controller 30 differs from that of the device of FIG. 2.

Figure 18B:
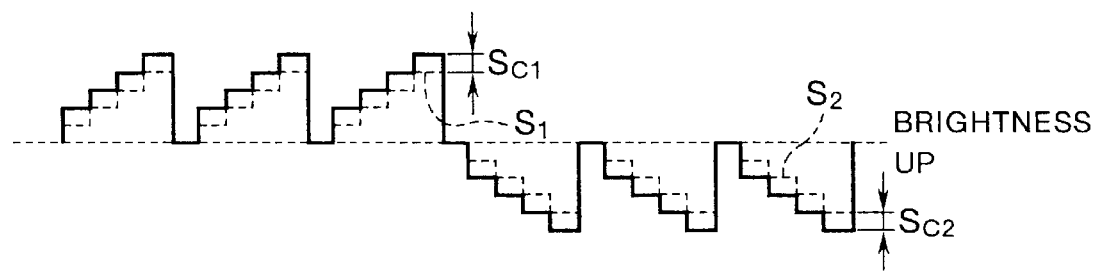
Figure 18C:
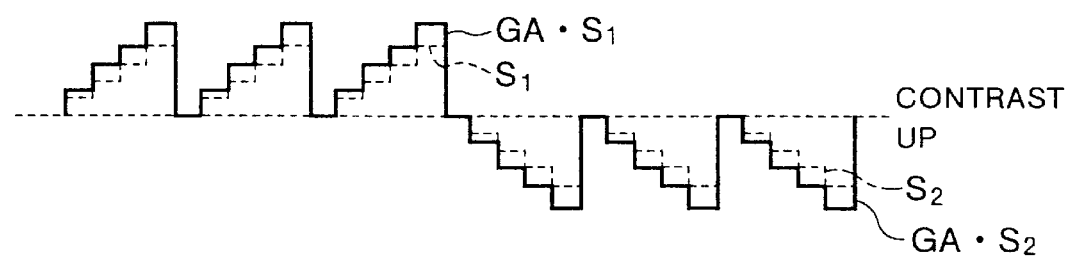
Figure 19:
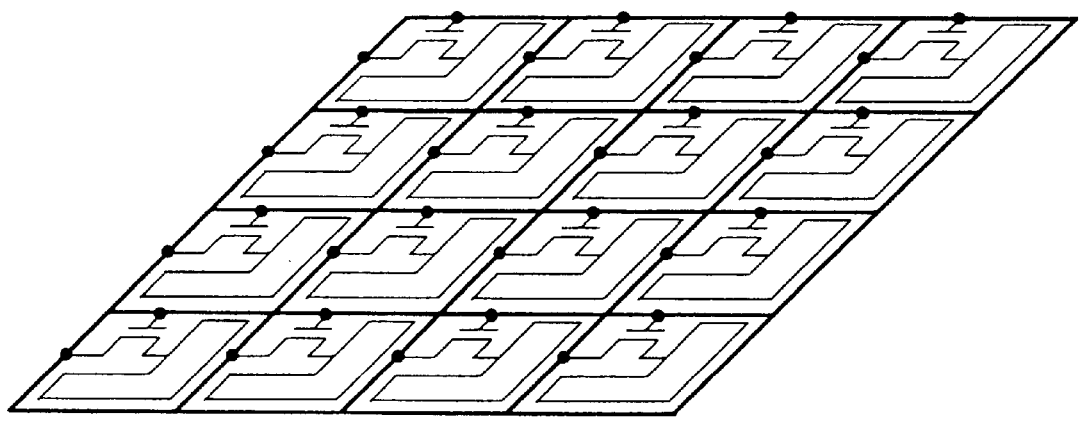
FIG. 19 is a perspective view schematically showing the structure of the liquid crystal panel of a projection-type liquid crystal display device according to the twelfth embodiment.

FIGS. 18A, 18B and 18C are waveform diagrams showing t he waveform of the video signal applied to the source electrode of individual thin-film transistors (TFTs), FIG. 19 is a perspective view schematically showing a portion of a TFT-type projection-type liquid crystal display device, and FIG. 20 is a waveform diagram showing the common voltage applied to the common electrode.

As shown in FIG. 18B, the brightness is adjusted by adding to or subtracting from the video signal $S_1$ or $S_2$ (in the case of FIG. 18B, by adding thereto) the offset component $S_{C1}$ or $S_{C2}$. And, as shown in FIG. 18C, the contrast is adjusted by varying the gain of source signal $S_1$ or $S_2$ making the source signal $GA \cdot S_1$ or $GA \cdot S_2$.

Further, as shown in FIGS. 18A, 18B and 18C, and FIG. 20, the polarity of the common voltage applied to the common electrode and that of the source voltage (video signal) are reversed field by field or frame by frame. In the above-described first through eleventh embodiments, the description was given in terms of suppressing the shift in the applied voltage vs. light transmittance characteristic due to changes in temperature caused by controlling the common voltage amplitude, but in the twelfth embodiment, as shown in FIGS. 18B and 18C, fluctuation in this applied voltage vs. light transmittance characteristic due to changes in temperature is suppressed by controlling the brightness and contrast of the source signals $S_1$ and $S_2$.

Figure 26:
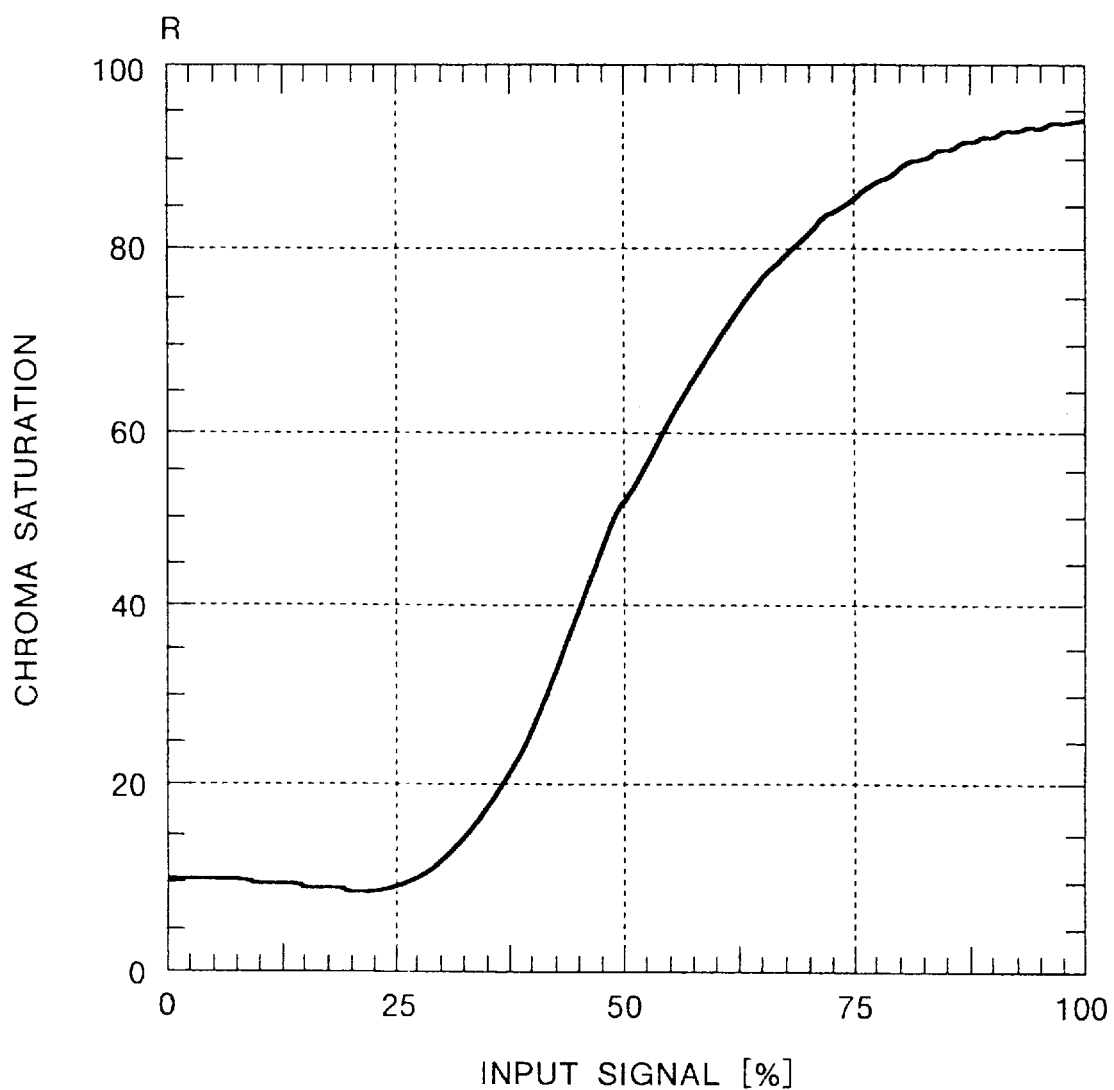
FIG. 26 is a graph showing the results of measurements of the input signal vs. chroma saturation characteristic for red luminous flux (R) in a prototype projection-type liquid crystal display device.
Figure 27:
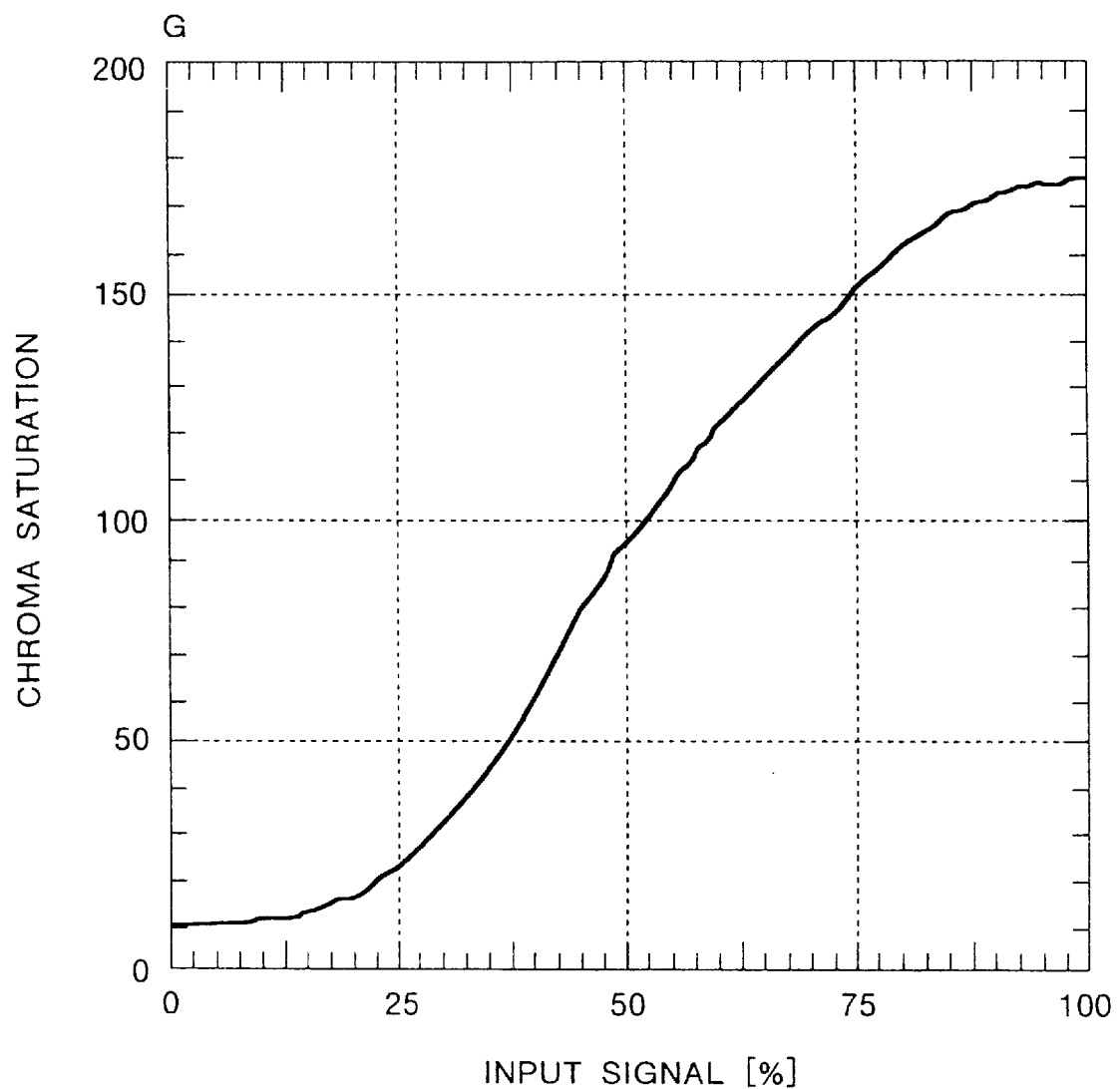
FIG. 27 is a graph showing the results of measurements of the input signal vs. chroma saturation characteristic for green luminous flux (G) in a prototype projection-type liquid crystal display device.
Figure 28:
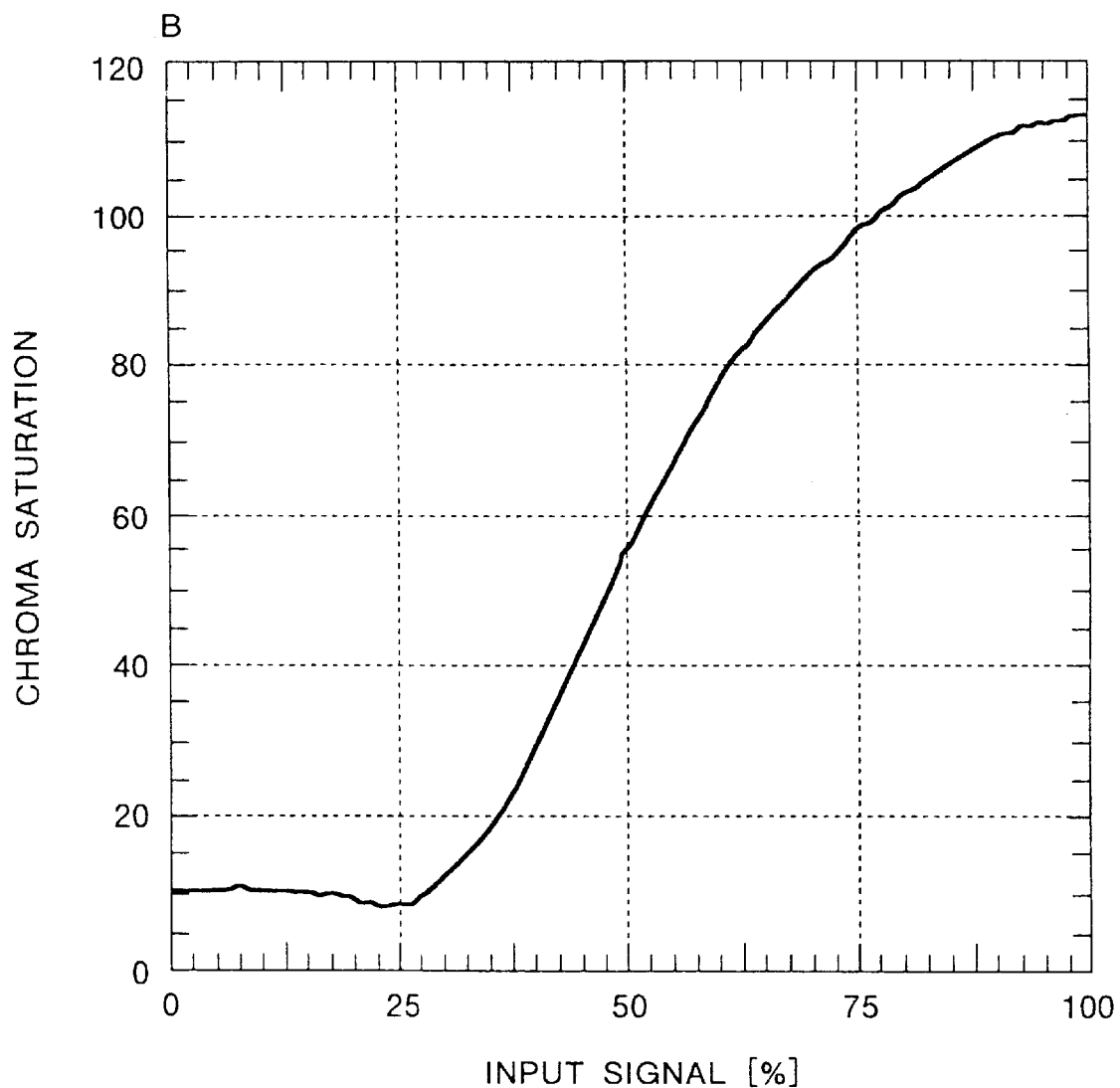
FIG. 28 is a graph showing the results of measurements of the input signal vs. chroma saturation characteristic for blue luminous flux (B) in a prototype projection-type liquid crystal display device.

As has already been explained, the prototype liquid crystal panel made of LCPC has the input signal vs. chroma saturation characteristic shown in FIG. 26 through FIG. 28. This difference in the input signal vs. chroma saturation characteristic due to color (i.e., wavelength) will obviously also be affected by differences in the temperatures of the red, green and blue liquid crystal panels. In the twelfth embodiment, in order to compensate for the effect of this temperature difference, red and blue chroma saturation is controlled using the input signal vs. chroma saturation characteristic of the green input signal as reference, in accordance with the values detected (for example, the average of the detected values) by temperature detectors 22, 23 and 24.

Specifically, as shown in FIGS. 21A, 21B, 21C and 21D, when the value detected (for example, the average of the detected values) by the temperature detectors 22, 23 and 24 is less than D(t1), red brightness and contrast is held constant and unchanging, and when it is less than D(t2), blue brightness and contrast is held constant and unchanging. When the temperature detected at the maximum operating environment temperature of the projection-type liquid crystal display device is t3, let it be assumed that the compensation values for optimum red and blue brightness and contrast are, respectively BR(t3), CR(t3), BB(t3) and CB(t3). Red brightness and contrast in the interval from detected value D(t1) to D(t3) will be values calculated by linear interpolation (first order approximation) of the brightness compensation value from 0 to BR(t3) and of the contrast compensation value from 0 to CR(t3). Similarly, the blue brightness and contrast in the interval from detected value D(t2) to D(t3) will be values calculated by linear interpolation (first order approximation) of the brightness compensation value from 0 to BB(t3) and of the contrast compensation value from 0 to CB(t3). The control values for brightness and contrast thus obtained are then input to the liquid crystal panels 12, 13 and 14. In FIG. 17, a symbol B represents the brightness control signal and a symbol C represents the contrast control signal. As has been described above, it is possible, by means of the twelfth embodiment, to prevent brightness and contrast that have once been adjusted at normal temperature from going out of adjustment due to changes in temperature. Moreover, it should be noted that with the exception of the points described above, the twelfth embodiment is identical to the above-described first embodiment.

Thirteenth Embodiment

With the exception of the content of control by the controller 30 and the control values stored in the memory 31, a projection-type liquid crystal display device according to a thirteenth embodiment of the present invention has structures that are identical to those of the device shown in FIG. 2. Accordingly, reference is also made to FIG. 2 in the description of the thirteenth embodiment.

As has already been explained, the prototype liquid crystal panel made of LCPC has the input signal vs. chroma saturation characteristic shown in FIG. 26 through FIG. 28. The difference in the input signal vs. chroma saturation characteristic due to color will obviously also be affected by differences in the temperatures of red, green and blue liquid crystal panels 12, 13 and 14. In the thirteenth embodiment, in order to compensate for the effect of this temperature difference, the red and blue chroma saturation is controlled using the input signal vs. chroma saturation characteristic of the green input signal as reference, in accordance with the values detected (for example, the average of the detected values) by the temperature detectors 22, 23 and 24.

Specifically, control values such as those as shown in FIGS. 22A, 22B, 22C and 22D are added to the memory 31, and the setting values for the brightness and contrast of the liquid crystal panels 12, 13 and 14, which were adjusted at close to normal temperature, are readjusted. The case will be explained, in which, the value detected (for example, the average of the detected values) by the temperature detectors 22, 23 and 24 reaches t1, the red of the projected image begins to become deeper, and the value detected (for example, the average of the detected values) by the temperature detectors 22, 23 and 24 reaches t2, the blue of the projected image begins to become deeper.

The red and blue brightness and contrast are held at the control values for normal temperature until the detected temperature exceeds t1 and t2. Then, when the detected temperature has exceeded t1 and t2, the control values stored in the memory 31 are added to the setting value for red and blue brightness and contrast, thereby preventing the red and blue colors from becoming deeper with respect to green. By means of the thirteenth embodiment, it is possible to prevent brightness and contrast that have once been adjusted at normal temperature from going out of adjustment due to changes in temperature. Moreover, it should be noted that with the exception of the points described above, the thirteenth embodiment is identical to the above-described first embodiment.

Fourteenth Embodiment

Figure 23:
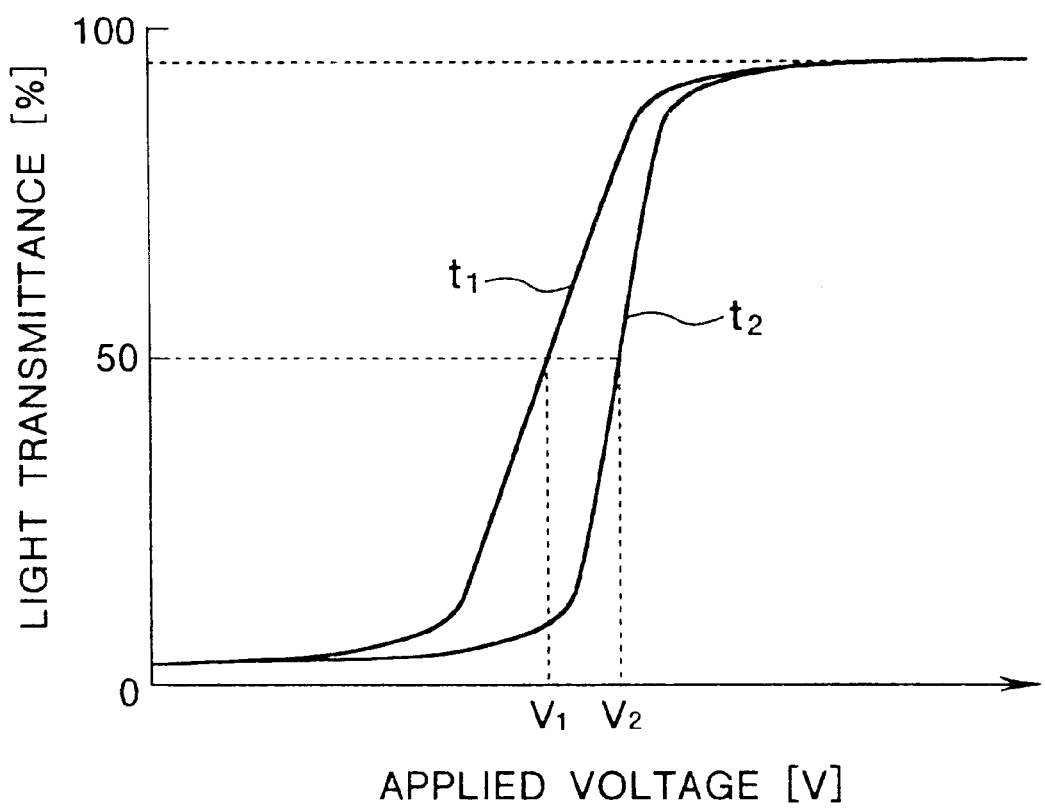
FIG. 23 is a graph showing the temperature-dependence of the applied voltage [V] vs. light transmittance [%] characteristic for a projection-type liquid crystal display device according to a fourteenth embodiment of the present invention.

FIG. 23 is a graph showing the temperature-dependence of the applied voltage [V] vs. light transmittance [%] characteristic for a projection-type liquid crystal display device according to a fourteenth embodiment of the present invention. As shown in FIG. 23, the applied voltage vs. light transmittance characteristic for the liquid crystal panels made of LCPC material shifts with the temperature of the liquid crystal panel, and moreover, the slope of the applied voltage vs. light transmittance characteristic changes with temperature. Generally speaking, in a low-temperature environment (liquid crystal panel temperature t1), the slope of the characteristic is gentle, whereas in a high-temperature environment (liquid crystal panel temperature t2), the slope is steep.

In the projection-type liquid crystal display device according to the fourteenth embodiment, in order to suppress fluctuation in the characteristic that is shown in FIG. 23, as shown, for example, in Equation (2), a temperature compensating value $I_t$ is obtained by subtracting some specified value $K_1$ from the value detected (for example, the average of the detected values $D(t_m)$) by the temperature detectors 22, 23 and 24, and multiplying it by a specified constant $K_2$. By adding this temperature compensating value $I_t$ to the control value for contrast at normal temperature, it is possible to compensate for the temperature dependence of the slope of the applied voltage vs. light transmittance characteristic. The method of compensation involves changing the source voltage in a similar manner to that in the above-described twelfth embodiment.

$$I_t = (D(t_m) - K_1) \times K_2 \qquad (2)$$

Here, $D(t_m)$ represents the value detected by the temperature detector corresponding to detected temperature $t_m$, and increases as temperature $t_m$ rises. $K_1$ is set so that, for example, the control value for contrast at normal temperature becomes 0. The absolute value of $K_2$ is set to agree with the control value for contrast, so that when the characteristic has a gentle slope with respect to temperature rise $K_2$ acts as a positive characteristic factor, and when it has a steep slope, $K_2$ acts as a negative characteristic factor. $K_1$ and K2 are determined by the number of bits and possible range of fluctuation of $D(t_m)$, and by the characteristic of the liquid crystal panel. By means of the fourteenth embodiment, it is possible to compensate for the temperature dependence of the slope of the applied voltage vs. light transmittance characteristic, and to display a good-quality image that is stable even when the temperature changes.

Fifteenth Embodiment

Figure 24:
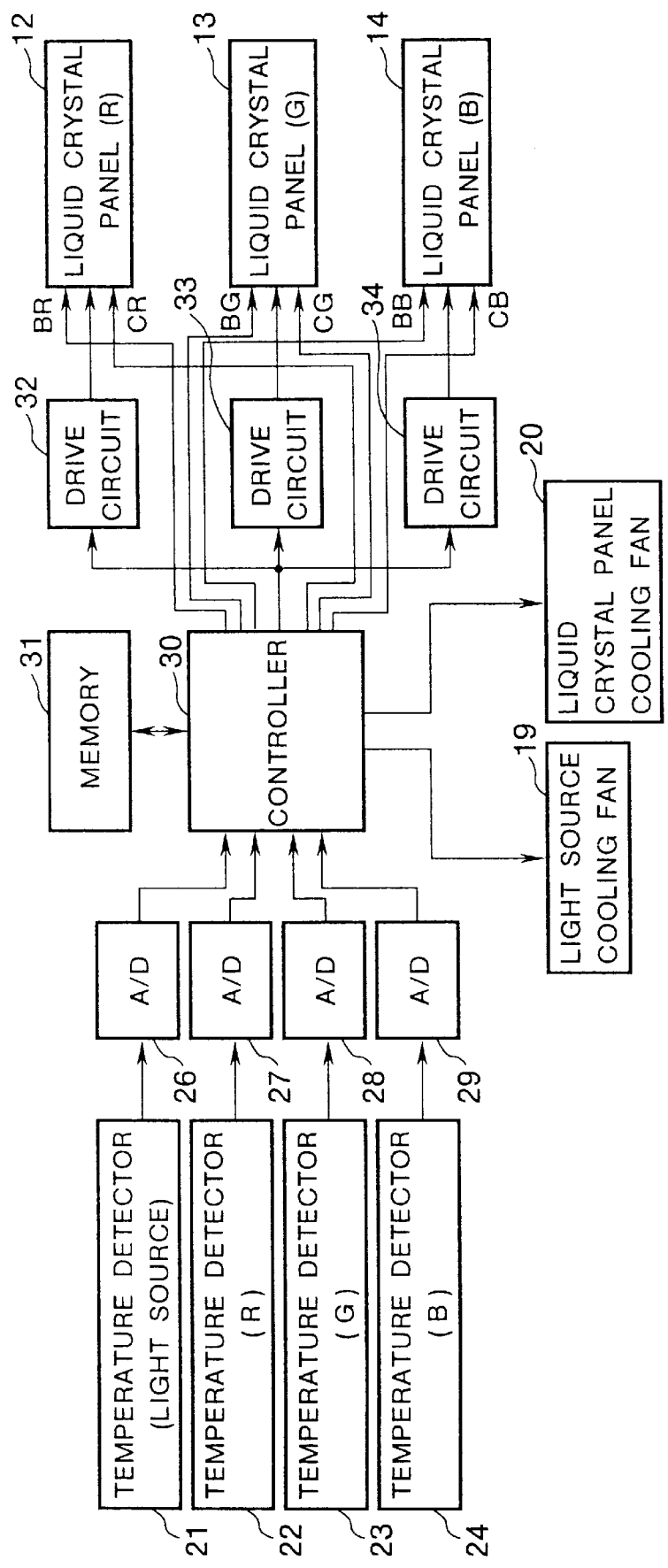
FIG. 24 is a block diagram showing the structure of the control system of a projection-type liquid crystal display device according to a fifteenth embodiment of the present invention.
Figure 25:
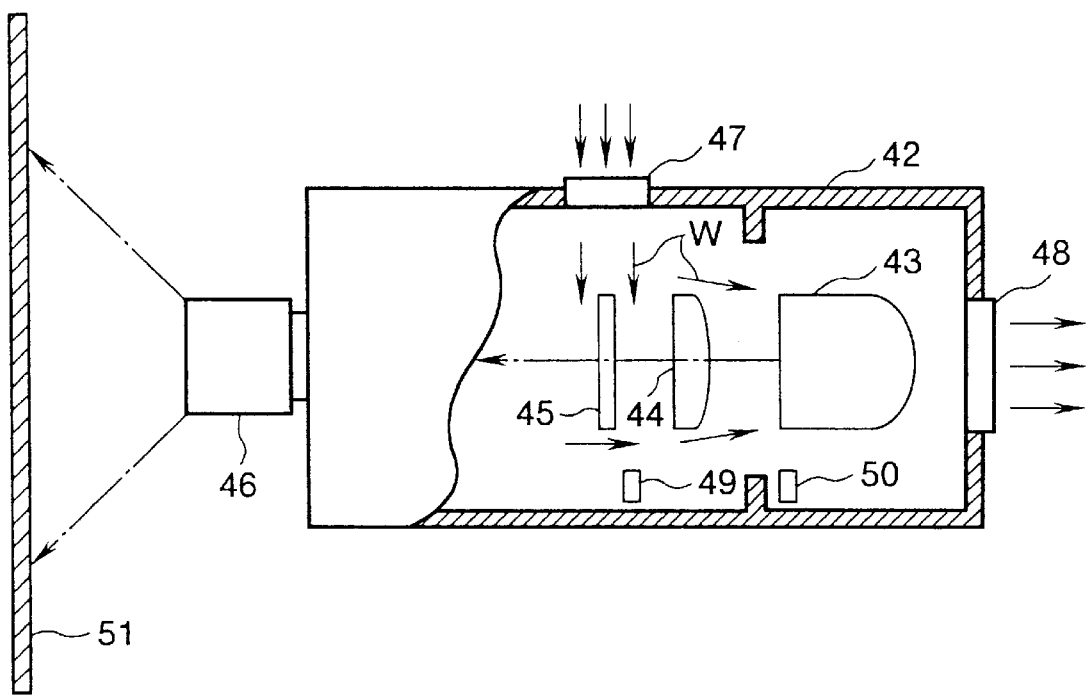
FIG. 25 is a structural diagram schematically showing a projection-type liquid crystal display device according to prior art.

FIG. 24 is a block diagram showing the structure of the control system of a projection-type liquid crystal display device according to a fifteenth embodiment of the present invention. Those structures in FIG. 24 that are identical to or correspond to structures in FIG. 2 are assigned identical symbols. According to the projection-type liquid crystal display device of the fifteenth embodiment, the content of control by the controller 30 differs from that of the device according to the above-described first embodiment.

In the fifteenth embodiment, the liquid crystal panels 12, 13 and 14 for different colors are mounted in different positions within the projection-type liquid crystal display device, so that the liquid crystal panels 12, 13 and 14 for different colors are at different temperatures. The image-forming surface of the liquid crystal panel located close to a heat source such as the light source 1 will be warmer than the image-forming surface of the other liquid crystal panels, and conversely, the image-forming surface of the liquid crystal panel located close to the liquid crystal panel cooling fan 20 will be cooler than the image-forming surface of the other liquid crystal panels. In order to compensate for the shift in the applied voltage vs. light transmittance characteristic due to these differences in temperature among the liquid crystal panels, the brightness and contrast of the liquid crystal panels 12, 13 and 14 for different colors are controlled individually on the basis of the values detected by each of the temperature detectors 22, 23 and 24. In FIG. 24, the brightness control signals input to the liquid crystal panels 12, 13 and 14 are represented by BR, BG and BB respectively, and the contrast control signals input to the liquid crystal panels 12, 13 and 14 are represented by CR, CG and CB respectively.

Specifically, control of each of the liquid crystal panels 12, 13 and 14 is carried out on the basis of the value detected by each of the temperature detectors 22, 23 and 24, in the same way as in the above-described twelfth, thirteenth and fourteenth embodiments. By means of the fifteenth embodiment, it is possible to assure that, even when a difference in temperature occurs because of a difference in the position in which the liquid crystal panels 12, 13 and 14 are mounted, it will have no effect on image quality. Moreover, it should be noted that with the exception of the points described above, the fifteenth embodiment is identical to the above-described first embodiment.

Sixteenth Embodiment

With the exception of the content of control by the controller 30, a projection-type liquid crystal display device according to a sixteenth embodiment of the present invention has structures that are identical to those of the device shown in FIG. 2. Accordingly, reference is also made to FIG. 2 in the description of the sixteenth embodiment.

In the sixteenth embodiment, when the value detected (for example, the average of the detected values) by the temperature detectors 22, 23 and 24, which detect temperature in the vicinity of the liquid crystal panels 12, 13 and 14, undergoes a variation per unit time $\Delta t$ (for example, $\Delta t=0.1$ seconds, and hereinafter described in terms of $\Delta t=0.1$ seconds) from $D(t-0.1)$ to $D(t)$, if the absolute value of the variation per unit time $|D(t)-D(t-0.1)|$ is greater than specified reference value Dth, red and blue brightness and contrast are controlled on the basis of the detected value $D(t)$ at time t, and if the absolute value $|D(t)-D(t-0.1)|$ is equal to or less than specified reference value Dth, red and blue brightness and contrast are maintained constant and unchanging.

Finally, when the detected value $D(t')$ when red and blue brightness and contrast are changed is stored. Then, the control, in which the absolute value of the variation per unit time $|D(t)-D(t-0.1)|$ is equal to or less than the specified reference value Dth and red and blue brightness and contrast are held constant and unchanging, is repeated for several iterations, and subsequently (for example, 1 second later after ten iterations) if the absolute value $|D(t)-D(t')|$ of the variation of detected values $D(t)$ and $D(t')$ at that time is greater than the specified reference value Dth', red and blue brightness and contrast are controlled in accordance with the detected value $D(t)$ at that time, and if the absolute value $|D(t)-D(t')|$ is equal to or less than the specified reference value Dth', red and blue brightness and contrast are held constant and unchanging.

When red and blue brightness and contrast are changed according to the detected value $D(t)$, and if the absolute value $|D(t)-D(t-0.1)|$ is greater than the specified reference value Dth, red and blue brightness and contrast are controlled according to the detected value $D(t)$ at that time, whereas if the absolute value $|D(t)-D(t-0.1)|$ is equal to or less than the specified reference value Dth, control is carried out in such a way that red and blue brightness and contrast are held constant and unchanging. When, on the other hand, red and blue brightness and contrast are not changed, and if the absolute value $|D(t)-D(t')|$ is greater than the specified reference value Dth', red and blue brightness and contrast are controlled according to the detected value $D(t)$ at that time, whereas if the absolute value $|D(t)-D(t')|$ is equal to or less than the specified reference value Dth', the control, in which that red and blue brightness and contrast are held constant and unchanging, is repeated for each unit of time.

By means of control carried out as described above, it is possible to suppress small, short-cycle fluctuation in the brightness of the projected image.

Seventeenth Embodiment

With the exception of the fact that the content of signal processing by the controller 30 is different, a projection-type liquid crystal display device according to a seventeenth embodiment of the present invention has structures that are identical to those of the device shown in FIG. 2. Accordingly, reference is made to FIG. 2 in the description of the seventeenth embodiment.

When the brightness at value T detected by the temperature detectors is set at $B(T)$, the value detected (for example, the average of the detected values) by the temperature detectors 22, 23 and 24 at a given point of time t is $D(t)$, and the optimum brightness at a given point of time t is $B(D(t))$, and if $|B(T)-B(D(t))|$ is smaller than a specified reference value Bth, the brightness is changed from the value $B(T)$ set at that point of time by the amount of the minimum quantized width (that is, set to $B(T+1)$ when brightness is to be increased, and to $B(T-1)$ when brightness is to be decreased), whereas, when $|B(T)-B(D(t))|$ is equal to or greater than the specified reference value Bth, brightness is set to $B(D(t))$.

Similarly, when the contrast at value T detected by the temperature detectors is set at $C(T)$, the value detected (for example, the average of the detected values) by the temperature detectors 22, 23 and 24 at a given point of time t is $D(t)$, and the optimum contrast at a given point of time t is $C(D(t))$, and if $|C(T)-C(D(t))|$ is smaller than a specified reference value Cth, the contrast is changed from the value $C(T)$ set at that point of time by the amount of the minimum quantized width (that is, set to $C(T+1)$ when contrast is to be increased, and to $C(T-1)$ when contrast is to be decreased), whereas, when $|C(T)-C(D(t))|$ is equal to or greater than specified reference value Cth, the contrast is set to $C(D(t))$.

Here, the change in minimum quantized width of brightness $|B(T+1)-B(T)|$ and the change in minimum quantized width of contrast |C(T+1)−C(T)| are set to be so small that they are virtually imperceptible to the eye. Further, reference values Bth and Cth are set to be sufficiently large so that, provided there is no abrupt rise in temperature within the projection-type liquid crystal display device at start-up and no abrupt change in the operating environment temperature, |B(T)−B(D(t))| will not exceed the reference value Bth and |C(T)−C(D(T))| will not exceed the reference value Cth. By means of control carried out as described above, it is possible to achieve rapid setting of the appropriate brightness and contrast when the response speed produced by changes in minimum quantized width is too slow, for exapmle, when there is an abrupt rise in the temperature within the device or an abrupt change in the operating environment temperature. Moreover, it should be noted that with the exception of the points described above, the seventeenth embodiment is identical to the above-described twelfth embodiment.

Eighteenth Embodiment

With the exception of the fact that the content of control by the controller 30 is different, a projection-type liquid crystal display device according to an eighteenth embodiment of the present invention comprises structures that are identical to those of the device shown in any of FIG. 2, FIG. 9, FIG. 10, FIG. 14, FIG. 15, FIG. 16, FIG. 17 and FIG. 24.

In the projection-type liquid crystal display device according to the eighteenth embodiment, control of the common voltage amplitude of the liquid crystal panels 12, 13 and 14, which was described in the first, second and fourth embodiments above, control of the cooling capacity of the liquid crystal panel cooling fan 20, which was described in the fifth embodiment above, control of reversing the blowing direction, which was described in the ninth embodiment above, control of operation of the blower fan, which was described in the tenth embodiment above, control of heating by means of the light source cooling fan and the heater, which was described in the eleventh embodiment above, or control of the brightness and contrast of the video signal applied to the source electrode, which was described in the twelfth, thirteenth, fourteenth and fifteenth embodiments above, are carried out individually for each of the liquid crystal panels 12, 13 and 14, respectively, for each colors.

Specifically, as shown in Equation (3) below, a value D(t) is calculated by adding weighting constants which are obtained by respectively multiplying kr, kg and kb and the values Dr(tr), Dg(tg) and Db(tb) detected by the temperature detectors 22, 23 and 24 together, and used in the abovementioned controls.

[0122]

$$D(t) = kr \cdot Dr(tr) + kg \cdot Dg(tg) + kb \cdot Db(tb) \quad (3)$$

Here, tr, tg and tb represent the temperatures detected by temperature detectors 22, 23 and 24 respectively, and t represents a temperature that is representative of the temperatures detected by the temperature detectors 22, 23 and 24. For example, the weighting constants kr, kg and kb may be 0.30, 0.59 and 0.11, where the weighting for green, which has the greatest effect on image quality, is highest. By finding the additive value including the weighting, and carrying out control as in each of the embodiments described above, it is possible, even in a case where the temperatures of the image-forming surfaces of the three liquid crystal panels differ, to carry out appropriate control taking account of the temperature difference.

It should be noted that in the embodiments described above, the device described had three liquid crystal panels 12, 13 and 14, but that each of the above embodiments can equally be practiced with a single-plate type device having only one liquid crystal panel.

Again, in a single-plate type device having only one liquid crystal panel, it is possible, by mounting a plurality of temperature detectors in the vicinity of that liquid crystal panel, to provide control of the common voltage amplitude and control of the liquid crystal panel cooling fan, taking account of the temperature distribution within the image-forming surface of the liquid crystal panel.

Further, in a single-plate type device having only one liquid crystal panel, it is possible, by mounting a plurality of temperature detectors in the vicinity of that liquid crystal panel, to provide control of rotation-reversing of the light source cooling fan 19 and the liquid crystal panel cooling fan 20, taking account of the temperature distribution within the image-forming surface of the liquid crystal panel.

Furthermore, in a single-plate type device having only one liquid crystal panel, it is possible, by mounting a plurality of temperature detectors in the vicinity of that liquid crystal panel, to provide control of air flow for the blower fan 40, taking account of the temperature distribution within the image-forming surface of the liquid crystal panel.

Moreover, in a single-plate type device having only one liquid crystal panel, it is possible, by mounting a plurality of temperature detectors in the vicinity of that liquid crystal panel, to provide control of the liquid crystal panel cooling fan 20 and the heater 41, taking account of the temperature distribution within the image-forming surface of the liquid crystal panel.

Again, in a single-plate type device having only one liquid crystal panel, it is possible, by mounting a plurality of temperature detectors in the vicinity of that liquid crystal panel, to provide control of brightness and contrast, taking account of the temperature distribution within the image-forming surface of the liquid crystal panel.

Further, in the various embodiments described above, the cases described were those in which the temperature detectors were provided in the vicinity of each of the three liquid crystal panels for red, green and blue, but it is equally possible to carry out the control described in the above embodiments by providing a single temperature detector in the vicinity of one representative liquid crystal panel (for example, the red liquid crystal panel) and deriving the temperatures of the image-forming surfaces of the other two liquid crystal panel by correlation on the basis of the temperature detected by this temperature detector.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A projection-type liquid crystal display device comprising:

a light source means for emitting a luminous flux;

a liquid crystal light valve means, which has a common electrode to which a common voltage is applied and a source electrode to which a video signal is applied, for modulating said luminous flux emitted by said light source means;

a liquid crystal drive means for applying said common voltage to said common electrode and said video signal to said source electrode;

a projection means for projecting said luminous flux modulated by said liquid crystal light valve means onto a screen;

a liquid crystal temperature detecting means for detecting temperature in the vicinity of said liquid crystal light valve means; and a control means for controlling said common voltage on the basis of values detected by said liquid crystal temperature detecting means in such a way that fluctuation in a light transmittance of said liquid crystal light value means is reduced;

wherein:

if the value detected by said liquid crystal temperature detecting means at time (t–Δt), where Δt is a specified unit of time, is represented by D(t–Δt), the value detected by said liquid crystal temperature detecting means at time t is represented by D(t), and a specified reference value is represented by Dth, when |D(t)–D(t–Δt)|>Dth, said control means controls a common voltage amplitude on the basis of said values detected by said liquid crystal temperature detecting means in such a way that fluctuation in the light transmittance of said liquid crystal light valve means is reduced, and when |D(t)–D(t–Δt)|≦Dth, a first processing is carried out repeatedly in such a way that said common voltage amplitude is held unchanging and constant;

a value D(t') detected when a final change in said common voltage amplitude has been effected is stored; and when, during an iteration of said first processing, |D(t)–D(t–Δt)|≦Dth and said common voltage amplitude is subjected to said first processing for a specified number of iterations in such a way that said common voltage amplitude is held constant and unchanging, when an absolute value |D(t)–(t')| of a change from detected value D(t) at time after which the subsequent specified period has elapsed and stored value D(t') is greater than a specified reference value Dth', said common voltage amplitude is controlled according to the detected value D(t), and when the absolute value |D(t)–D(t')| is equal to or less than said reference value Dth', said common voltage amplitude is subjected to a second processing in such a way that said common voltage amplitude is held unchanging and constant.

2. A projection-type liquid crystal display device comprising:

a light source means for emitting a luminous flux;

a liquid crystal light valve means, which has a common electrode to which a common voltage is applied and a source electrode to which a video signal is applied, for modulating said luminous flux emitted by said light source means;

a liquid crystal drive means for applying said common voltage to said common electrode and said video signal to said source electrode;

a projection means for projecting said luminous flux modulated by said liquid crystal light valve means onto a screen;

a liquid crystal temperature detecting means for detecting temperature in the vicinity of said liquid crystal light valve means; and a control means for controlling said common voltage on the basis of values detected by said liquid crystal temperature detecting means in such a way that fluctuation in a light transmittance of said liquid crystal light value means is reduced;

wherein:

if a common voltage amplitude at value T detected by said temperature detecting means, where T is a currently set value, is represented by A(T), the optimum value of said common voltage amplitude at value D(t) detected by said liquid crystal temperature detecting means is represented by A(D(t)), and a specified reference value is represented by Ath, when 0<A(T)–A(D(t))<Ath, said common voltage amplitude is changed from A(T) to A(T–1);

when 0<A(D(t))–A(T)<Ath, said common voltage amplitude is changed from A(T) to A(T+1); and when |A(T)–A(D(t))|≧Ath, said common voltage amplitude is set to A(D(t)).

3. A projection-type liquid crystal display device comprising:

a light source means for emitting a luminous flux;

a liquid crystal light valve means, which has a common electrode to which a common voltage is applied and a source electrode to which a video signal is applied, for modulating the luminous flux emitted by said light source means;

a liquid crystal drive means for applying the common voltage to said common electrode and the video signal to said source electrode;

a projection means for projecting the luminous flux modulated by said liquid crystal light valve means onto a screen;

a liquid crystal temperature detecting means for detecting temperature in the vicinity of said liquid crystal light valve means; and a control means for controlling voltage of said video signal on the basis of values detected by said liquid crystal temperature detecting means in such a way that fluctuation in a light transmittance of said liquid crystal light vale means is reduced;

wherein:

if the value detected by said liquid crystal temperature detecting means at time (t–Δt), where Δt is a specified unit of time, is represented by D(t–Δt), the value detected by said liquid crystal temperature detecting means at time t is represented by D(t), and a specified reference value is represented by Dth, when |D(t)–D(t|Δt)|>Dth, said control means controls a video signal voltage on the basis of said values detected by said liquid crystal temperature detecting means in such a way that fluctuation in the light transmittance of aid liquid crystal light valve means is reduced, and when |D(t)–D(t–Δt)|<Dth, a first processing is carried out repeatedly in such a way that said video signal voltage is held unchanging and constant;

a value D(t') detected when a final change in said video signal voltage has been effected is stored; and when, during an iteration of said first processing, when |D(t)–D(t–Δt)|≦Dth and said video signal voltage is subjected to said first processing for a specified number of iterations, in such a way that said video signal voltage is held constant and unchanging, when an absolute value |D(t)–D(t')| of a change from detected value D(t) at time after which the subsequent specified period has elapsed and stored value of D(t') is greater than a specified reference value Dth', said video signal voltage applied to said source electrode is controlled according to the detected value D(t), and when the absolute value |D(t)–D(t')| is equal to or less than said reference value Dth', said video signal voltage is subjected to a second processing in such a way that said video signal voltage is held constant and unchanging.

4. A projection-type liquid crystal display device comprising:
- a light source means for emitting a luminous flux;
- a liquid crystal light valve means, which has a common electrode to which a common voltage is applied and a source electrode to which a video signal is applied, for modulating the luminous flux emitted by said light source means;
- a liquid crystal drive means for applying the common voltage to said common electrode and the video signal to said source electrode;
- a projection means for projecting the luminous flux modulated by said liquid crystal light valve means onto a screen;
- a liquid crystal temperature detecting means for detecting temperature in the vicinity of said liquid crystal light valve means; and
- a control means for controlling voltage of said video signal on the basis of values detected by said liquid crystal temperature detecting means in such a way that fluctuation in a light transmittance of said liquid crystal light vale means is reduced;
- wherein
  - if said brightness at value T detected by said temperature detecting means, where T is a currently set value, is represented by B(T), the optimum value of said brightness at value D(t) detected by said liquid crystal temperature detecting means is represented by B(D(t)), and a specified reference value is represented by Bth,
    - when 0<B(T)−B(D(t))<Bth, said brightness is changed from B(T) to B(T−1),
    - when 0<B(D(t))−B(T)<Bth, said brightness is changed from B(T) to B(T+1), and
    - when |B(T)−B(D(t))|≧Bth, said brightness is changed from B(t) to B(D(t)); and
  - if said contrast at value T detected by said temperature detecting means, where T is a currently set value, is represented by C(T), the optimum value of said contrast at value (d(t) detected by said liquid crystal temperature detecting means is represented by C(D(t)), and a specified reference value is represented by Cth,
- when 0<C(T)−C(D(t))<Cth, said contrast is changed from C(T) to C(T−1),
- when 0<C(D(t))−C(T)<Cth, said contrast is changed from C(T) to C(T+1), and
- when |C(T)−C(D(t))|≧Cth, said contrast is changed from C(T) to C(D(t)).

* * * * *